United States Patent
Kirk et al.

(10) Patent No.: US 10,888,801 B2
(45) Date of Patent: Jan. 12, 2021

(54) SECONDARY-PHASE SEPARATION APPARATUS AND A METHOD THEREOF

(71) Applicant: EXTERRAN WATER SOLUTIONS ULC, Calgary (CA)

(72) Inventors: Todd William Kirk, Rocky View County (CA); Daniel Clifford Whitney, Cochrane (CA)

(73) Assignee: EXTERRAN WATER SOLUTIONS ULC

( * ) Notice: Subject to any disclaimer, the term of this patent is extended or adjusted under 35 U.S.C. 154(b) by 348 days.

(21) Appl. No.: 15/713,295

(22) Filed: Sep. 22, 2017

(65) Prior Publication Data

US 2019/0091607 A1    Mar. 28, 2019

(51) Int. Cl.
| | |
|---|---|
| *B01D 17/02* | (2006.01) |
| *B01D 17/12* | (2006.01) |
| *C02F 1/24* | (2006.01) |
| *C02F 1/40* | (2006.01) |
| *C02F 101/32* | (2006.01) |

(52) U.S. Cl.
CPC ...... *B01D 17/0205* (2013.01); *B01D 17/0211* (2013.01); *B01D 17/0214* (2013.01); *B01D 17/12* (2013.01); *C02F 1/24* (2013.01); *C02F 1/40* (2013.01); *C02F 2101/32* (2013.01); *C02F 2201/002* (2013.01); *C02F 2301/026* (2013.01)

(58) Field of Classification Search
CPC .................................................. B01D 17/0205
See application file for complete search history.

(56) References Cited

U.S. PATENT DOCUMENTS

| | | | |
|---|---|---|---|
| 7,534,354 B2 | 5/2009 | Oserod | |
| 2015/0053600 A1* | 2/2015 | Kirk ..................... | B03D 1/1462 210/209 |

FOREIGN PATENT DOCUMENTS

CA    2922411 A1    3/2015

OTHER PUBLICATIONS

ISA/CA—Canadian Intellectual Property Office—International Search Report and Written Opinion dated Apr. 26, 2018—PCT/CA2017/051124.

* cited by examiner

*Primary Examiner* — Peter Keyworth
(74) *Attorney, Agent, or Firm* — D. Doak Horne

(57) ABSTRACT

A separation tank for separating a contaminant from a multiple-phase fluid stream has a vessel formed by a top wall, a bottom wall, and a sidewall. The vessel has a plurality of nested and fluidly connected chambers therein. A fluid inlet is in fluid communication with the outermost chamber of the vessel for introducing the multiple-phase fluid stream thereinto. A fluid outlet is in fluid communication with the innermost chamber of the vessel for discharging a contaminant-removed fluid stream out of the vessel. At least one chamber of the vessel has one or more gas inlets at a lower portion thereof for injecting gas bubbles into the chamber for facilitating contaminant removal. In operation, the fluid stream travels from the fluid inlet through the plurality of chambers to the fluid outlet along an elongated helical spiral flow path.

30 Claims, 18 Drawing Sheets

SECONDARY-PHASE SEPARATION APPARATUS AND A METHOD THEREOF

FIELD OF THE DISCLOSURE

The present disclosure relates generally to an apparatus and a method for secondary-phase separation, and in particular to an apparatus and a method for separating a secondary-phase or contaminant from a multiple-phase fluid stream such as produced water.

BACKGROUND

Secondary-phase separation vessels or tanks are used to separate an unwanted secondary phase or contaminant such as hydrocarbons or suspended solids from a multiple-phase fluid stream such as produced water. Secondary-phase separation tanks generally operate by allowing or facilitating the rising of the unwanted secondary phase or contaminant (which may comprise one or more unwanted components such as oil, iron, silicates, organic solids, and the like) to the surface of produced water. The unwanted secondary phase or contaminant may then be removed via skimming of the surface of the produced water.

Examples of secondary-phase separation vessels/tanks include API separators which employ gravity-based separation techniques; Induced Gas Flotation (IGF) devices which use injected gas bubbles to aid in separating the secondary phase and contaminant; and Induced Static Flotation (ISF) which likewise use gas bubbles to aid in separating the secondary phase and contaminant.

One of the problems with the latter two types of secondary-phase separation vessels/tanks is that they do not provide sufficient time for effective distribution of the gas bubbles within the contaminated fluid, nor sufficient time for such gas bubbles to attach themselves by natural agglomeration to contaminant or unwanted phase and then be able to thereby cause or bring such contaminant or unwanted phase to the surface via flotation for subsequent removal via skimming.

Specifically, in the case of the latter two types of secondary-phase separation vessels/tanks, gas bubbles are typically introduced into the center of a chamber via a sparging pipe, or generated mechanically via motor-driven paddles. Such methods of introducing gas bubbles into the center of the chamber reduce the likelihood of contact of gas bubbles with contaminant that may not be located in the center of the chamber.

Moreover, existing tanks are typically designed to allow contaminant to be floated to the surface of the tank due to differential specific gravities between the contaminant (such as oil) and the main-phase fluid (such as water), and/or to allow agglomeration of gas bubbles to contaminant which causes such contaminant to rise to the surface of the tank. Both techniques then allow for skimming of the contaminant from the surface of the tank and resulting purification of the remaining liquid (leaving the cleanest fluid in the bottom of the tank/vessel).

However, when transferring such fluid from a first chamber to a subsequent chamber for repetition of the process and for subsequent successive purification, both technologies transfer fluid from said first chamber into a bottom of the subsequent chamber. Such a process (termed a "bottom-to-bottom" flow) is problematic.

Specifically, one manner in which the "bottom-to-bottom" flow is problematic is that it causes a "short circuiting" issue, namely allowing unpurified water to directly and unintentionally pass from a chamber to a subsequent chamber without sufficient residence time within each chamber for removal of impurities therefrom by gas flotation or specific gravity separation.

Moreover, and further problematical is the fact that as the cleanest fluid in each chamber is generally in the bottom thereof, the "bottom-to-bottom" flow causes the so-called "dilution" effect, namely diluting the cleanest fluid in the subsequent chamber with the fluid from the previous chamber that needs to be further purified. This "dilution" effect thereby to some extent "undoes" the phase separation already accomplished in the subsequent chamber and adds to required residence time to further effect separation, and/or works against achieving greater purification via successive similar chambers "daisy chained" together.

SUMMARY

According to one aspect of this disclosure, there is provided a secondary-phase separation apparatus and a method for removing one or more contaminants from a multiple-phase fluid stream. The secondary-phase separation apparatus and method reduce or otherwise avoid the aforementioned "short-circuiting" and dilution problems.

According to one aspect of this disclosure, there is provided an apparatus for separating a contaminant from a multiple-phase fluid stream having at least a main-phase fluid and the contaminant. The apparatus comprises a vessel formed by at least a bottom wall and a sidewall, the vessel comprising therein a plurality of nested and fluidly connected chambers, the vessel and each chamber proximate an upper region thereof having and being in communication with a skimming structure; a fluid inlet in fluid communication with one of an innermost or an outermost chamber of the plurality of said nested and fluidly connected chambers for introducing the multiple-phase fluid stream into said vessel; and a fluid outlet in fluid communication with the other of the innermost or the outermost chamber of the plurality of said nested and fluidly connected chambers for discharging a contaminant-removed fluid stream out of the vessel. During operation, the fluid stream travels through said plurality of nested and fluidly connected chambers in an elongated helical spiral flow path from the fluid inlet to the fluid outlet of the vessel for allowing the contaminant to separate from the fluid stream and flow into said skimming structure.

In some embodiments, the plurality of chambers are coaxial.

In some embodiments, the vessel further comprises a top wall.

In some embodiments, the fluid inlet is in fluid communication with the outermost chamber and the fluid outlet is in fluid communication with the innermost chamber.

In some embodiments, the vessel further comprises one or more vertically-oriented baffles extending upwardly from the bottom wall of the vessel for forming the plurality of chambers.

In some embodiments, the fluid inlet is at an elevation at or below the top edge of an outermost baffle of the one or more baffles.

In some embodiments, the fluid inlet is located at an upper portion of the vessel and at an elevation at or below the top edge of an outermost baffle of the one or more baffles.

In some embodiments, each baffle comprises a side opening at a lower portion thereof for fluid communication between the chambers inner and outer thereto. Said elongated helical spiral flow path extends through each side opening. Said elongated helical spiral flow path is a downward helical spiral flow path in entering each side opening, and is an upward helical spiral flow path in exiting from each side opening.

In some embodiments, each said side opening is coupled to an interconnecting passage on an outer surface of the corresponding baffle.

In some embodiments, at least one of the plurality of chambers comprises a vertically-oriented shroud extending upwardly from the bottom wall of the vessel for partitioning the chamber into a first region and a second region.

In some embodiments, the first region is an outer region of the chamber and the second region is an inner region of the chamber.

In some embodiments, each shroud has a height lower than the heights of the baffles neighboring thereto.

In some embodiments, said elongated helical spiral flow path is an upward helical spiral flow path in each first region, and is a downward helical spiral flow path in each second region.

In some embodiments, the apparatus further comprises one or more gas inlets received in at least one of the plurality of chambers for injecting gas bubbles for removal of the contaminant.

In some embodiments, at least one of the one or more gas inlets is located approximate said fluid inlet.

In some embodiments, at least one of said first regions comprises at least one of the one or more gas inlets.

In some embodiments, the one or more gas inlets inject gas bubbles into a lower portion of the at least one of the plurality of chambers that the one or more gas inlets are received therein.

In some embodiments, each of the one or more gas inlets comprises a discharge end facing a downstream direction of the flow path.

In some embodiments, the skimming structure comprises a skimming trough in fluid communication with at least said outermost of said plurality of chambers and said innermost of said plurality of chambers. Said skimming trough has a pair of sidewalls and a bottom wall. Respective heights of the sidewalls of the trough are larger where in fluid communication with said outermost chamber of the one or more chambers than those in the innermost of said plurality of chambers.

In some embodiments, said skimming trough extends through the plurality of chambers for collecting separated contaminant from said upper region of said vessel.

In some embodiments, a bottom wall of said trough is sloped upwardly towards the innermost chamber.

In some embodiments, a bottom wall of said trough is leveled and extends horizontally towards the innermost chamber.

In some embodiments, a bottom wall of said trough is sloped downwardly towards the innermost chamber.

In some embodiments, the fluid inlet is tangential to the sidewall of the vessel.

In some embodiments, the fluid inlet is horizontally oriented and is tangential to the sidewall of the vessel.

According to one aspect of this disclosure, there is provided a method of separating a contaminant from a multiple-phase fluid stream having at least a main-phase fluid and the contaminant. The method comprises: injecting the fluid stream into a vessel having a plurality of nested and fluidly connected chambers therein; directing the fluid stream through a plurality of nested and fluidly connected chambers in the vessel via an elongated helical spiral flow path for separating the contaminant and allowing separated contaminant to rise in the vessel; skimming the contaminant from the fluid stream proximate an upper region of the vessel; and discharging contaminant-removed fluid out of the vessel.

In some embodiments, the step of skimming the contaminant from the fluid stream is carried out by: situating a skimming structure transversely across a portion of said upper region of said vessel; and causing said fluid stream to swirl in said upper region so that the contaminant which has risen to said upper region of said vessel flows towards and into said skimming structure.

In some embodiments, said injecting the fluid stream into the vessel comprises: injecting the fluid stream into an outermost chamber of the plurality of nested and fluidly connected chambers; and said discharging contaminant-removed fluid out of the vessel comprises: discharging contaminant-removed fluid out of the vessel from an innermost chamber of the plurality of nested and fluidly connected chambers.

In some embodiments, said injecting the fluid stream into the vessel comprises: injecting the fluid stream into the vessel from an upper portion thereof.

In some embodiments, said directing the fluid stream through the plurality of nested and fluidly connected chambers in the vessel via the elongated helical spiral flow path comprises: directing the fluid stream to enter at least one chamber from a lower portion thereof.

In some embodiments, the method further comprises: injecting gas bubbles into the vessel for mixing with the fluid stream for facilitating contaminant removal.

In some embodiments, said injecting gas bubbles into the vessel comprises: injecting gas bubbles into at least a beginning portion of the elongated helical spiral flow path in the vessel.

In some embodiments, said injecting gas bubbles into the vessel comprises: injecting gas bubbles into the vessel towards a downstream direction of the flow path.

In some embodiments, said injecting gas bubbles into the vessel comprises: in at least one chamber, directing the fluid stream to travel within a first region of the chamber via an upward helical spiral flow path, said upward helical spiral flow path being a portion of the elongated flow path; and injecting gas bubbles into the first region of the chamber for mixing with the fluid stream while the fluid stream is travelling along the upward helical spiral flow path.

In some embodiments, said injecting gas bubbles into the vessel further comprises: in at least one chamber, after the fluid stream exits from the first region of the chamber, directing the fluid stream along a downward helical spiral flow path within a second region of the chamber, said upward helical spiral flow path being a portion of the elongated flow path.

In some embodiments, the first region is an outer region of the chamber and the second region is an inner region of the chamber.

In some embodiments, the method further comprises: using said skimming structure situated in said upper region of said vessel in at least partial fluid communication with at least one of said plurality of connected chambers to collect contaminant in said upper portion of the vessel.

In some embodiments, said injecting the fluid stream into a vessel comprises: injecting the fluid stream into a vessel at a direction tangential to a sidewall of the vessel.

In some embodiments, said injecting the fluid stream into a vessel comprises: injecting the fluid stream into a vessel at a horizontal direction tangential to a sidewall of the vessel.

According to one aspect of this disclosure, there is provided a vessel for separating a contaminant from a multiple-phase fluid stream having at least a main-phase fluid and the contaminant. The vessel comprises one or more internal baffles extending upwardly from a bottom wall of the vessel for forming a plurality of coaxial and fluidly connected chambers in the vessel; a fluid inlet coupled to one of the innermost or outermost chamber of the plurality of coaxial and fluidly connected chambers for introducing the multiple-phase fluid stream into said vessel; a fluid outlet coupled to the other of the innermost or outermost chamber of the plurality of coaxial and fluidly connected chambers for discharging a contaminant-removed fluid stream out of the vessel; and one or more gas inlets received in at least one of the plurality of chambers for injecting gas bubbles into said fluid stream for removal of the contaminant. During operation, the fluid stream travels through said plurality of coaxial and fluidly connected chambers in an elongated helical spiral flow path from the fluid inlet to the fluid outlet of the vessel and gas bubbles injected through said one or more gas inlets agglomerate onto the contaminant for causing the contaminant to separate from the fluid stream and rise upwardly in said vessel and flow into a skimming structure.

In some embodiments, at least one of the one or more gas inlets is located approximate said fluid inlet.

In some embodiments, numbering the one or more internal baffles from the baffle forming the chamber coupled to the fluid inlet to the baffle forming the chamber coupled to the fluid outlet, each odd-numbered baffle comprises an upper opening at an upper portion thereof and each even-numbered baffle comprises a lower side opening at a lower portion thereof. Said elongated helical spiral flow path extends through each opening.

In some embodiments, each said side opening is coupled to an interconnecting passage on an outer surface of the corresponding baffle.

In some embodiments, each chamber upstream to an adjacent one of the upper openings receives therein one or more gas inlets at a lower portion thereof for injecting gas bubbles into the vessel.

In some embodiments, the fluid inlet is at an elevation at or below the top edge of the baffle forming the chamber coupled the fluid inlet.

In some embodiments, the fluid inlet is located at an upper portion of the vessel and coupled to the outermost chamber, and the fluid inlet is at an elevation at or below the top edge of the outermost baffle.

In some embodiments, said skimming structure is located at an upper portion of the vessel and extends through the one or more baffles for collecting separated contaminant.

In some embodiments, the skimming structure comprises a skimming trough having a pair of sidewalls and a bottom wall. The height of each of the sidewalls of the skimming trough in a first one of the chambers is larger than that in a second one of the chambers that is downstream to the first chamber.

In some embodiments, the bottom wall of the skimming trough is sloped upwardly towards the innermost chamber.

In some embodiments, the bottom wall of the skimming trough is leveled and extends horizontally towards the innermost chamber.

In some embodiments, the bottom wall of the skimming trough is sloped downwardly towards the innermost chamber.

In some embodiments, the fluid inlet is tangential to the sidewall of the vessel.

In some embodiments, the fluid inlet is horizontally oriented and is tangential to the sidewall of the vessel.

BRIEF DESCRIPTION OF THE DRAWINGS

The accompanying drawings illustrate one or more exemplary embodiments of the present disclosure and are not to be construed as limiting the invention to these depicted embodiments. The drawings are not necessarily to scale, and are simply to illustrate the concepts incorporated in the present disclosure.

DETAILED DESCRIPTION

Figure 1:
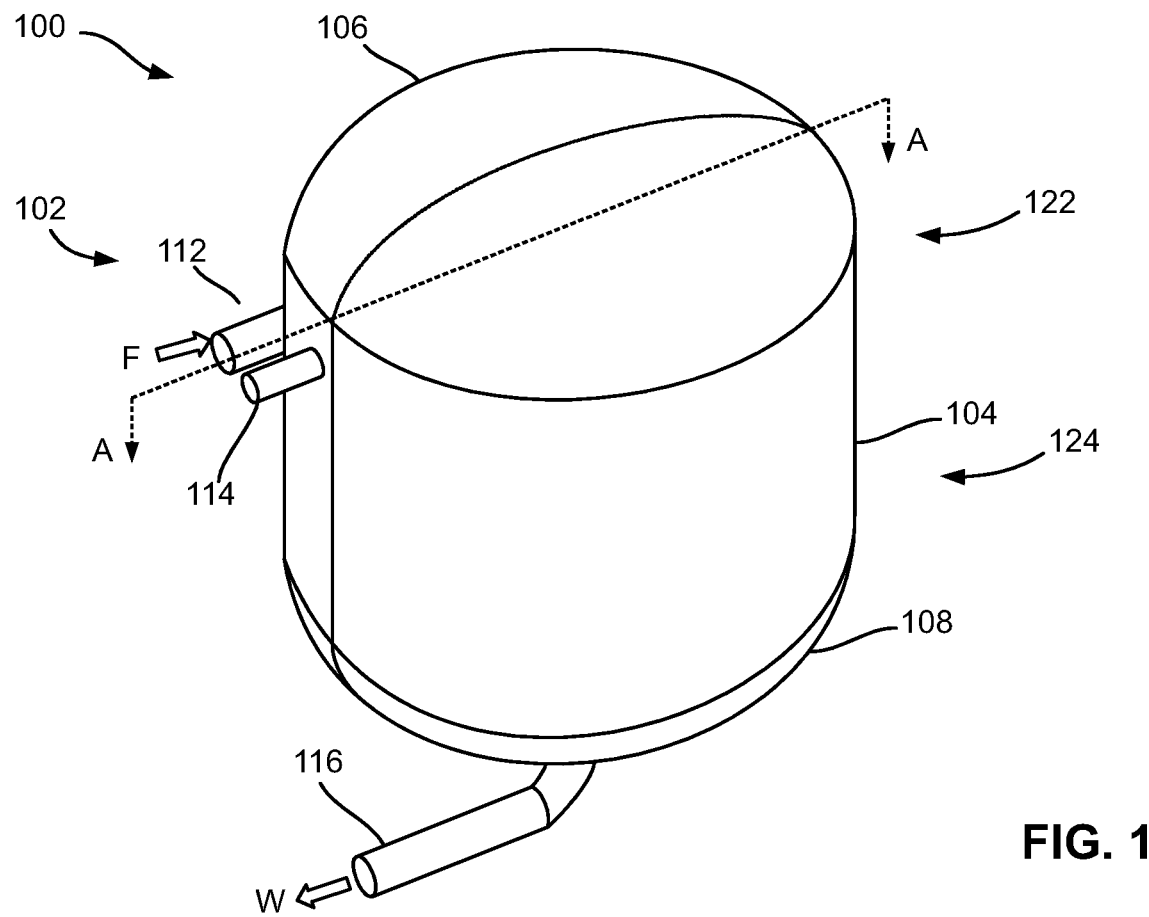
FIG. 1 is a perspective view of a secondary-phase separation apparatus, according to one embodiment of this invention.

Embodiments herein disclose a secondary-phase separation apparatus for separating a secondary-phase or contaminants from a multiple-phase fluid stream. Herein, the multiple-phase fluid stream is a fluid stream comprising a main-phase fluid and an unwanted, secondary phase or contaminant. The secondary phase or contaminant may comprise one or more components. For example, in some embodiments, the multiple-phase fluid stream may be produced water, in which the main-phase fluid is water and the contaminant is hydrocarbons or oil.

The secondary-phase separation apparatus disclosed herein uses injected gas bubbles or microbubbles for facilitating contaminant removal by gas-contaminant contact and agglomeration. In some embodiments, the secondary-phase separation apparatus creates an elongated helical spiral flow path in a separation vessel for the multiple-phase fluid stream to travel therealong, thereby providing sufficient residence time for effectively separating contaminant from the multiple-phase fluid during its travel in the separation vessel. By using such an elongated helical spiral flow path, the separation vessel has an advantage of occupying a smaller space compared to prior-art secondary-phase separation devices.

In some embodiments, the secondary-phase separation apparatus comprises a vertically oriented vessel comprising an upper, contaminant-accumulation section and a lower, contaminant-separation section. The contaminant-separation section is divided or partitioned into a plurality of nested chambers by one or more vertically-oriented cylindrical internal baffles. Each baffle comprises one or more interconnecting passages at a lower portion thereof for allowing a fluid steam to flow therethrough. Therefore, all chambers are fluidly connected and in fluid communication via at least the interconnecting passages of the baffles. A fluid inlet extends into the outermost chamber at an upper portion thereof. The fluid inlet is below the top edge of at least the outermost baffle to prevent any "short-cut" flow path from the fluid inlet to a fluid outlet located at a lower portion of the innermost chamber.

One or more chambers may each comprise a shroud that further partitions the chamber into an outer, gas-mixing region and an inner, contaminant-removal region. One or more gas inlets are located at a lower portion of the gas-mixing region for injecting gas bubbles or microbubbles thereinto.

If the innermost chamber comprises a shroud partitioning the chamber into a gas-mixing region and a contaminant-removal region, the fluid outlet is preferably located in the contaminant-removal region of the innermost chamber.

The contaminant-accumulation section comprises a skimming structure such as a U-shaped skim weir or trough extending from a contaminant discharge outlet radially inwardly through the baffles to about the center of the innermost chamber for collecting and skimming the separated contaminant.

The secondary-phase separation apparatus thus creates an elongated helical spiral flow path in the vessel thereof for contaminant separation. The elongated helical spiral flow path extends from the fluid inlet to the fluid outlet through the plurality of chambers. In each chamber, the flow path is an upward helical spiral flow path in the gas-mixing region of the chamber, and is a downward helical spiral flow path in the contaminant-removal region thereof. The upward helical spiral flow path in the gas-mixing region aligns the direction of the flow path with that of the gas bubbles, thereby giving rise to effective engagement between gas bubbles and contaminants. The downward helical spiral flow path in the contaminant-removal region avoids the bottom-to-bottom flow and the "short circuiting" issue. The elongated helical spiral flow path also creates swirl in the vessel which also facilitates the secondary-phase separation. In particular, the elongated helical spiral flow path causes the fluid stream to swirl in an upper region of the vessel so that the contaminant which has risen to the upper region of the vessel flows towards and into the skimming structure.

Figure 2:
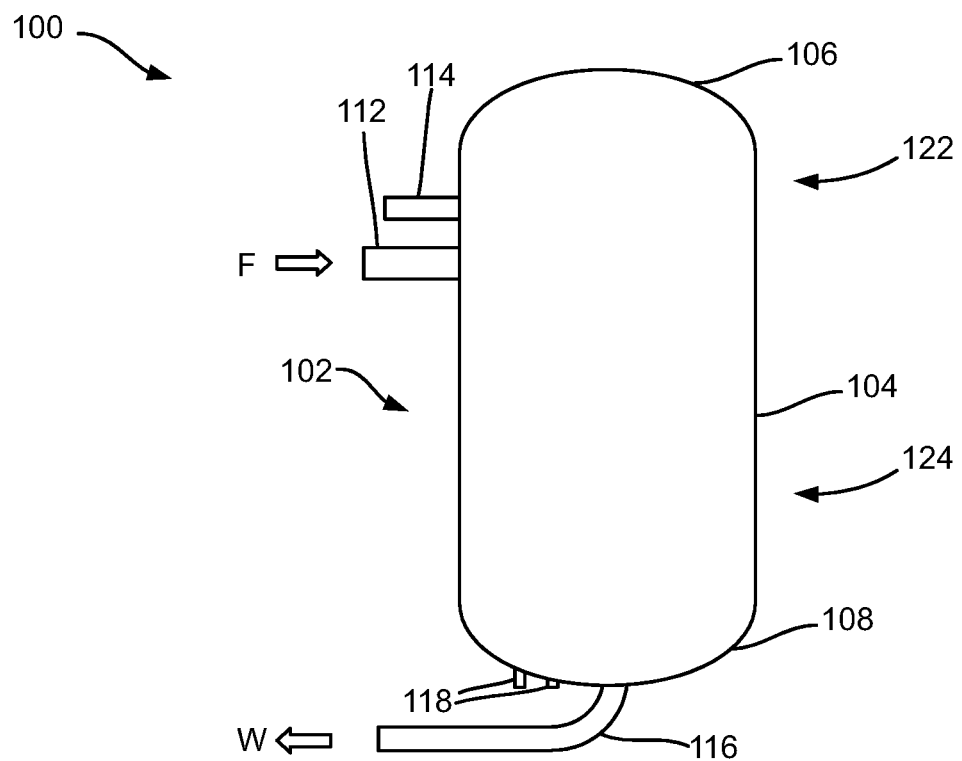
FIG. 2 is a side view of the secondary-phase separation apparatus shown in FIG. 1.

Turning now to FIGS. 1 and 2, a secondary-phase separation apparatus is shown and is generally identified using reference numeral 100. The secondary-phase separation apparatus 100 receives a multiple-phase fluid stream F having a main-phase fluid and one or more unwanted components collectively denoted as a secondary phase or contaminant, and removes the contaminant from the multiple-phase fluid stream F. The contaminant has a density smaller than that of the main-phase fluid or suspensible in the main-phase fluid. For example, in this embodiment, the multiple-phase fluid stream F is produced water in which the main-phase fluid is water and the contaminant is hydrocarbons or oil. As will be described in more detail later, gas bubbles are mixed with the multiple-phase fluid stream F in the secondary-phase separation apparatus 100 for facilitating the removal of the contaminant.

In this embodiment, the secondary-phase separation apparatus 100 is in the form of a separation tank and comprises a generally vertically oriented vessel 102, which comprises a cylindrical sidewall 104, a hemispherical or semi-elliptical top wall 106 and a hemispherical or semi-elliptical bottom wall 108. In this embodiment, the top wall 106, the cylindrical sidewall 104, and the bottom wall 108 are welded together to form the vessel 102.

The vessel 102 may be partitioned into an upper, contaminant-accumulation section 122 for accommodating gas and contaminant separated from the injected multiphase fluid stream, and a lower, contaminant-separation section 124 for separating contaminant from injected multiphase fluid stream.

The separation tank 100 comprises a fluid inlet 112 located about a top of the contaminant-separation section 124 for introducing a multiple-phase fluid stream F into the vessel 102. In this embodiment, the fluid inlet 112 is at an elevation of about 60% to 80% of the height of the vessel 102.

As will be described in more detail later, the injected fluid stream F travels in the vessel 102 along an elongated helical spiral flow path toward the bottom thereof. One or more gas inlets 118 on the bottom wall 108 of the vessel 102 inject gas bubbles or microbubbles into a lower portion of the vessel 102. As shown, at least one of the gas inlets 118 is located in proximity with the fluid inlet 112 or about a beginning portion of the elongated helical spiral flow path. The injected gas bubbles engage or adhere to the contaminant in the fluid stream and carry the contaminant towards the surface of the fluid for accumulation in the contaminant-accumulation section 122. The contaminant accumulated in the contaminant-accumulation section 122 is then removed from the vessel 102 via a contaminant discharge outlet 114. The contaminant-removed fluid stream W is discharged from a fluid outlet 108 on the bottom wall 108 of the vessel 102. Those skilled in the art will appreciate that, although the separation tank 100 may remove a significant amount of contaminant, the contaminant-removed fluid stream W may still comprise some residue amount of contaminant.

In some figures described below, the contaminant discharge outlet 114 is not shown for ease of illustration.

As shown in FIGS. 3 to 9, the fluid inlet 112 extends substantially horizontally from the sidewall 104 into the interior space of the contaminant-separation section 124, and is oriented generally tangential to the sidewall 104 for directing the fluid stream F into the vessel 102. The horizontally-oriented fluid inlet 112 also allows it to be easily connected to upstream pipes and/or equipment that is typically oriented in a rectilinear or orthogonal arrangement.

The contaminant-separation section 124 comprises one or more vertically-oriented, cylindrical baffles 140 (such as baffles 140A and 140B shown in FIGS. 3 to 9) in a coaxial or concentric manner with one enclosing another. The one or more cylindrical baffles 140 extend upwardly from the bottom wall 108 into the contaminant-accumulation section 122. The top edge of at least an outermost baffle 140A is at an elevation above the fluid inlet 112 for preventing any "shortcut" flow path from the fluid inlet 112 directly to the fluid outlet 116. In this embodiment, the top edge of each baffle 140 is at a distance from the top wall 106 for facilitating the accumulation and collection of gas and the separated contaminant.

The one or more cylindrical baffles 140 partition the contaminant-separation section 124 of the vessel 102 into a plurality of circular chambers 142 (such as chambers 142A to 142C shown in FIGS. 3 to 9) in a coaxial or concentric manner with one chamber enclosing another. Each baffle 140 comprises one or more side openings 144 (see FIG. 3 wherein each baffle 140 comprises two side openings 144) at a lower portion thereof. Each side opening 144 is coupled to an interconnecting passage 146 with a passage outer opening 148 at an outer surface of the baffle 140 for directing fluid from the chamber outer thereof into the chamber inner thereof, and the side opening 144 thus forms a passage inner opening. Therefore, all chambers 142 are fluidly connected and in fluid communication with each other through the passage inner openings 144 and the interconnecting passages 146, thereby creating an elongated, helical spiral flow path from the fluid inlet 112 to the fluid outlet 116 for increased residence time of fluid flow in the vessel 102, and for sufficiently separating the contaminant from the injected fluid stream.

In the example shown in FIGS. 1 to 9, the vessel 102 comprises two concentric cylindrical baffles 140A and 140B, thereby partitioning the contaminant-separation section 124 of the vessel 102 into three concentric chambers 142A to 142C. Each baffle 140 comprises a side opening 144 on a lower portion of the baffle 140. Each side opening 144 is coupled to an interconnecting passage 146 curved along an outer surface of the corresponding baffle 140 and forms a passage inner opening thereof.

Figure 3:
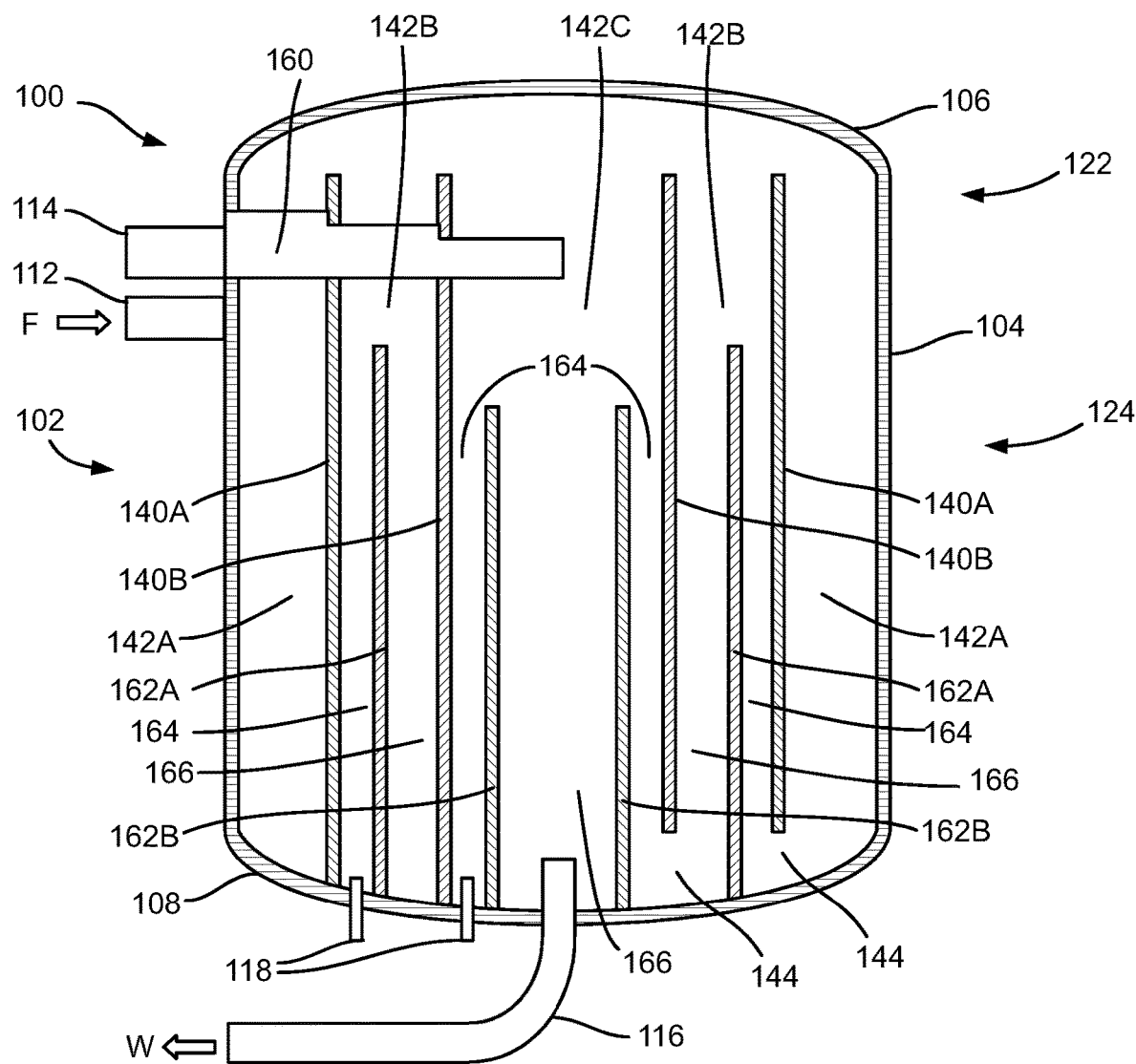
FIG. 3 is a cross-sectional view along the section line A-A of the secondary-phase separation apparatus shown in FIG. 1.

In the contaminant-accumulation section 122, the vessel 102 comprises a skimming structure which in this embodiment is a U-shaped skim weir or trough 160 coupled to the contaminant discharge outlet 114 and transversely across a portion of an upper region of the vessel 102 for collecting and skimming the separated contaminant. In particular, the trough 160 extends from the sidewall 104 radially inwardly through the baffles 140 to about the center of the innermost chamber 142C. As shown in FIG. 3, in this embodiment, the trough 160 has staggered or stepped sidewalls with the height thereof reducing from the outermost chamber 142A to the innermost chamber 142C for adapting to the different elevations of the liquid surfaces therein. In particular, the sidewalls of the trough 160 have a highest height in the outermost chamber 142A, and have a lowest height in the innermost chamber 142C.

As described above, the secondary-phase separation apparatus 100 uses gas bubbles or microbubbles (i.e., small-size gas bubbles) for facilitating contaminant separation. For this purpose, one or more chambers 142 each comprise a cylindrical shroud 162 (such as the shrouds 162A and 162B shown in FIG. 3) extending upwardly from the bottom wall 108 to an elevation below the fluid inlet 112 and the bottom of the trough 160. As will be described in more detail later, in operation, the liquid surface in each chamber 142 is maintained above the top edge of the cylindrical shroud 162 therein.

In this embodiment, the height of each shroud 162 is lower than the heights of the neighboring baffles 140, and is selected to adapt to the liquid surface elevation. As shown in FIG. 3, a shroud 162B in an inner chamber 142C has a height smaller than that of the shroud 162A in an outer chamber 142B.

Figure 10:
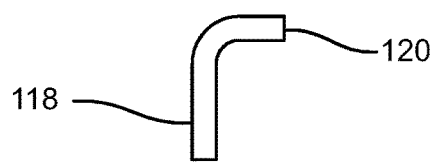
FIG. 10 is a side view of a gas inlet of the secondary-phase separation apparatus shown in FIG. 1.

Each shroud 162 partitions the corresponding chamber 142 into an outer, gas-mixing region 164 and an inner, contaminant-removal region 166. Each gas-mixing region 164 comprises one or more gas inlets 118 extending from the bottom wall 108 to a lower portion of the gas-mixing region 164 for injecting gas bubbles or microbubbles into the chamber 142 from a lower location thereof. As shown in FIG. 10, in this embodiment, each gas inlet 118 has a substantially horizontal discharge end 120 for injecting gas bubbles at a substantially horizontal direction.

As will be described in more detail later, the shroud 162 creates an upward helical spiral flow path in the gas-mixing region 164, which is generally coincidence with the movement direction of the gas bubbles, thereby facilitating the adherence of the gas bubbles to the contaminant. The shroud 162 also creates a downward helical spiral flow path in the contaminant-removal region 166, thereby facilitating the separation of the contaminant-adhered gas bubbles and the main-phase fluid.

As shown in FIG. 3, a fluid outlet 116 is located on the bottom wall 108 within the contaminant-removal region 166 of the innermost chamber 142C for discharging contaminant-removed main-phase fluid out of the vessel 102. In this embodiment, the fluid outlet 116 is located at the center of the bottom wall 108, and comprises a vortex breaker 168 for preventing the formation of vortices in the contaminant-removed main-phase fluid that may otherwise entrap gas and cause cavitation in a pump downstream to the fluid outlet 116.

Figure 11:
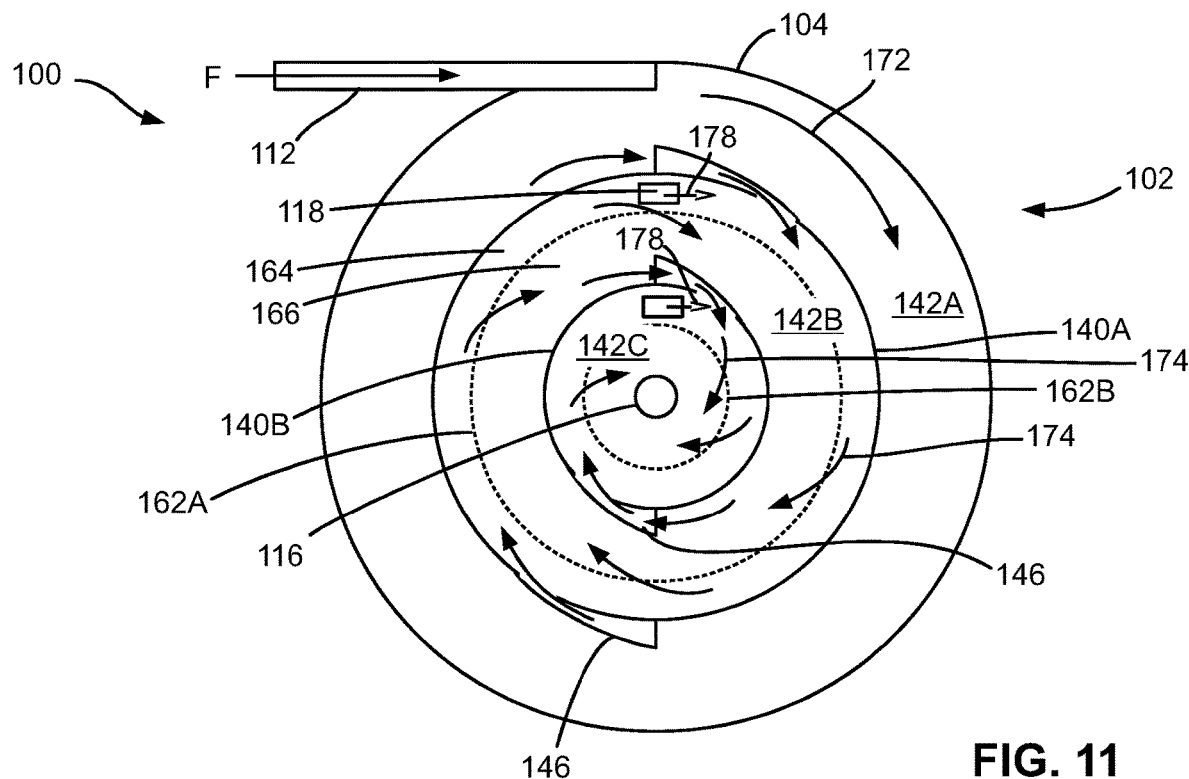
FIG. 11 is a schematic plane view of the secondary-phase separation apparatus shown in FIG. 1 with the top wall thereof removed for showing the flow path therein during operation.
Figure 12:
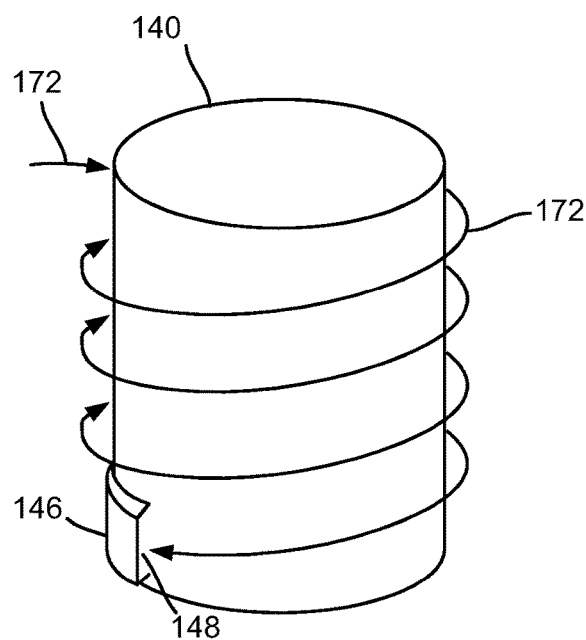
FIG. 12 shows a fluid flow path about a cylindrical baffle of the secondary-phase separation apparatus shown in FIG. 1.
Figure 13:
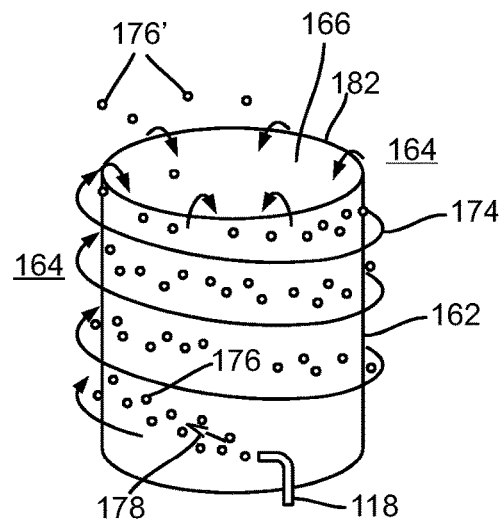
FIG. 13 shows a fluid flow path about a cylindrical shroud of the secondary-phase separation apparatus shown in FIG. 1.
Figure 14A:
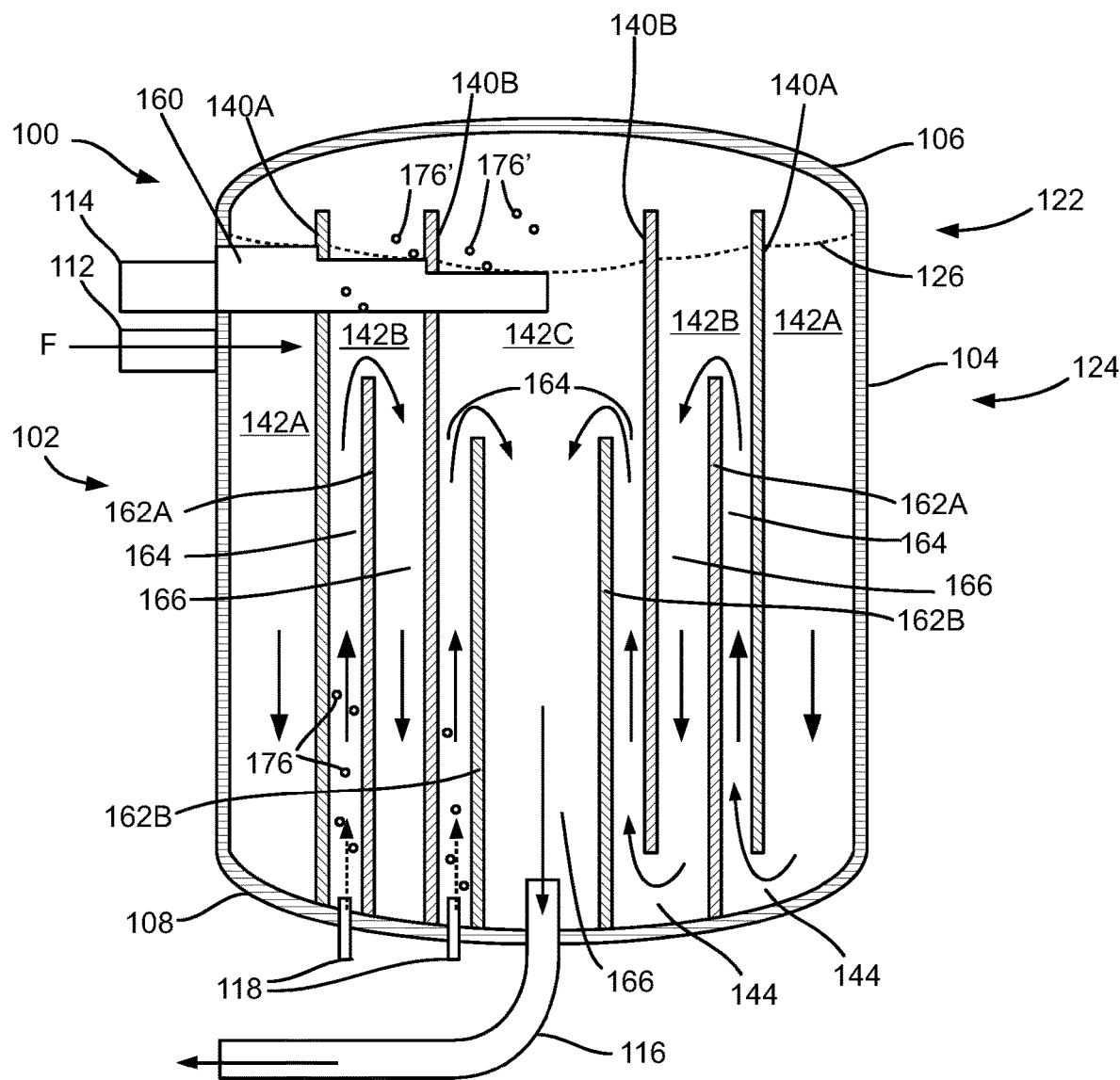
FIG. 14A is a schematic cross-sectional view of the secondary-phase separation apparatus shown in FIG. 1, illustrating the vertical flow directions of the fluid stream and the gas bubbles in the chambers thereof.
Figure 14B:
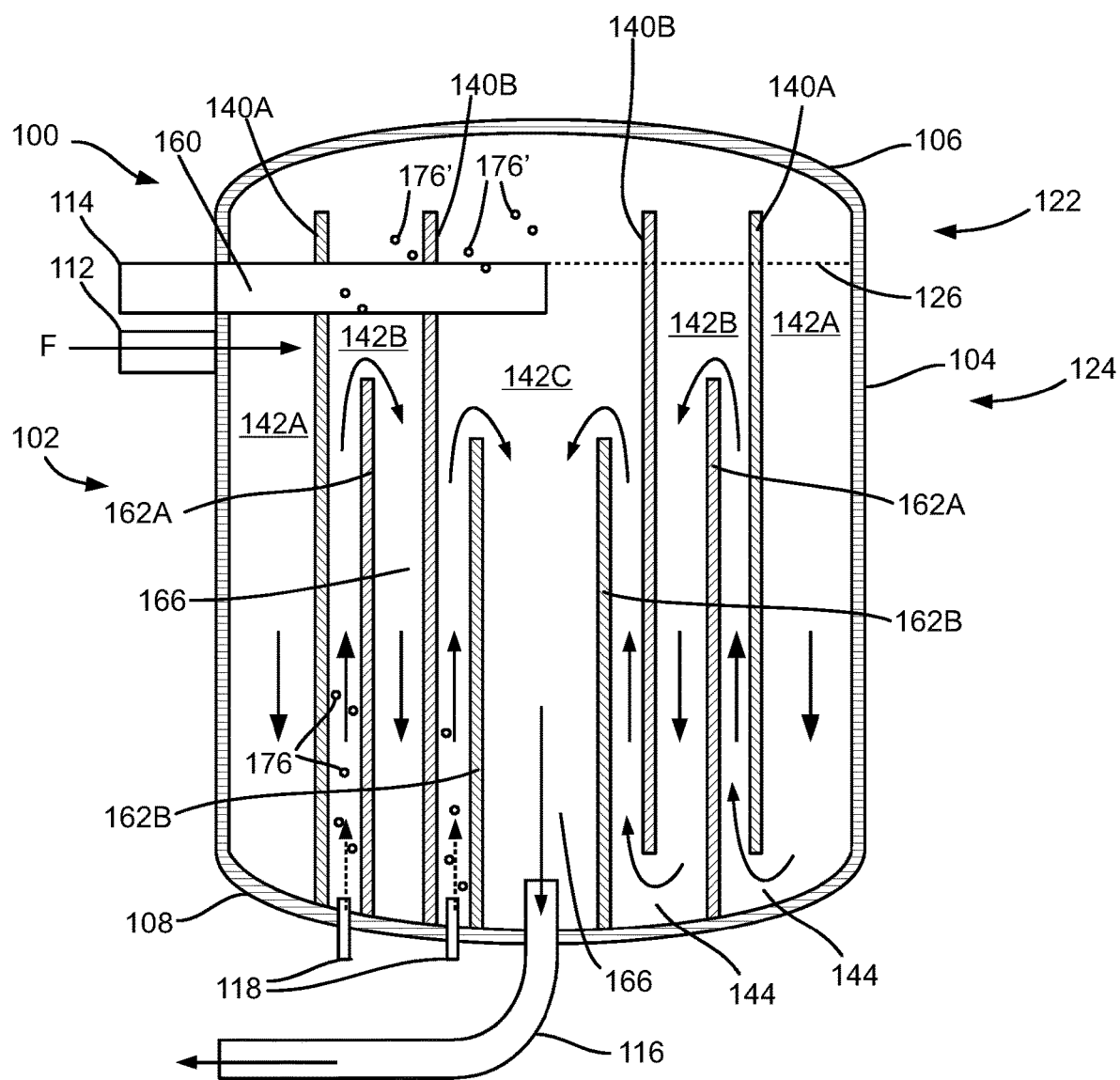
FIG. 14B is a schematic cross-sectional view of the secondary-phase separation apparatus, according to an alternative embodiment of this invention.
Figure 15:
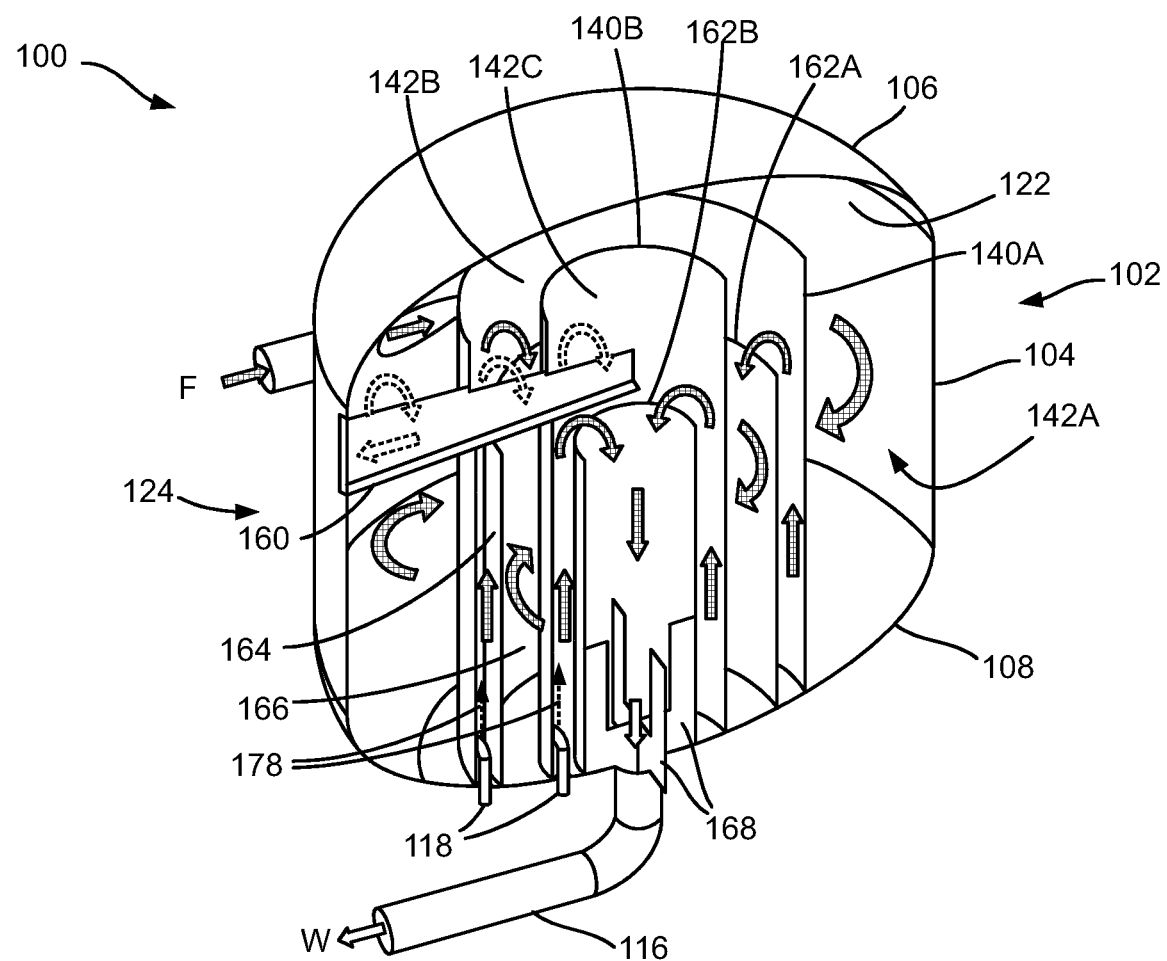
FIG. 15 is a perspective cross-sectional view of the secondary-phase separation apparatus shown in FIG. 1, showing the flow directions of fluid flow, the gas bubbles and the contaminant in the chambers thereof.

FIGS. 11 to 15 show the secondary-phase separation apparatus 100 in operation. In particular, FIG. 11 is a schematic plane view of the secondary-phase separation apparatus 100 with the top wall removed; FIG. 12 shows a fluid flow path about a cylindrical baffle 140; FIG. 13 shows a fluid flow path about a cylindrical shroud 162; FIG. 14A is a schematic cross-sectional view of the secondary-phase separation apparatus 100, showing the vertical flow directions of the fluid stream (indicated using solid-line arrows) and the gas bubbles (indicated using broken-line arrows) in each chamber 142, and showing the uneven fluid surface 126 in each chamber 142; FIG. 14B is a schematic cross-sectional view of the secondary-phase separation apparatus 100 in some alternative embodiments, showing the vertical flow directions of the fluid stream (indicated using solid-line arrows) and the gas bubbles (indicated using broken-line arrows) in each chamber 142, and showing the uniformed fluid surface 126 in each chamber 142; and FIG. 15 is a perspective cross-sectional view of the secondary-phase separation apparatus 100 showing flow directions of the fluid flow (indicated using solid-line block arrows), the gas bubbles (indicated using broken-line arrows) and the contaminant (indicated using broken-line block arrows) therein. In FIGS. 11 to 13, the trough 160 is not shown for ease of illustration.

As shown, a multiple-phase fluid stream F, such as a produced water stream having water and oil, is injected into an upper portion of the contaminant-separation section 124 of the vessel 102 via the fluid inlet 112. As the fluid inlet 112 is below the top of at least the outermost baffle 140A, any "shortcut" flow path from the fluid inlet 112 directly to the fluid outlet 116 is prevented, thereby avoiding the "short-circuit" problem. The fluid stream flows along a downward helical spiral flow path 172 in the outermost chamber 142A (see FIGS. 11 and 12) towards a lower portion of the contaminant-separation section 124. Such a downward helical spiral flow path 172 promotes some lighter-density contaminant such as oil to rise to the surface (not shown) and is skimmed by the trough 160.

At the lower portion of the contaminant-separation section 124, the fluid flow enters the gas-mixing region 164 of the next inner chamber 142B through the interconnecting passages 146. As the interconnecting passages 146 are at the lower portion of the chamber 142A in proximity with the bottom thereof, the fluid entering the next chamber 142B tends to be cleaner and contains less oil.

As shown in FIGS. 11 and 13, in chamber 142B, the fluid stream first flows in the gas-mixing region 164 from a lower portion thereof along an upward helical spiral flow path 174 towards the top of the gas-mixing region 164.

One or more gas inlets 118 in the gas-mixing region 164 inject gas bubbles or microbubbles 176 such as methane, air or nitrogen bubbles into the fluid stream in a lower portion of the gas-mixing region 164. As shown in FIGS. 11 and 13, the discharge end 120 of each gas inlet 118 faces downstream of the flow path and at a direction substantially tangential to the shroud 162, such that the gas inlet 118 injects gas bubbles 176 towards a direction 178 substantially the same as the flow direction 174 for inducing or at least facilitating the helical spiral flow path.

The gas bubbles injected through the one or more gas inlets 118 agglomerate onto the contaminant in the fluid stream, and cause the contaminant to separate from the fluid stream, rise upwardly in the vessel 102 towards the top of the gas-mixing region 164, and flow into the skimming structure 160.

In some embodiments, the injection speed of the gas bubbles 176 is controlled for controlling the fluid flow speed.

As is known in the art, gas is more likely to engage or adhere to the contaminant such as oil when the speed and direction of the gas bubbles are similar to those of the fluid flow. As the fluid flowing in the gas-mixing region 164 is substantially along an upward helical spiral flow path 174, and the gas injection speed may be controlled to be similar to the speed of the fluid flow, gas bubbles 176 then engage the oil in the fluid flow in an efficient manner. As shown in FIG. 13, oil-engaged gas bubbles 176' move upwardly and accumulate in the contaminant-accumulation section 122 above the shroud 162, and the fluid flow (with oil partially removed) enters contaminant-removal region 166 of the chamber 142B from the top edge 182 of the shroud 162.

The fluid flow in the contaminant-removal region 166 of the chamber 142B flows along a downward helical spiral path similar to the flow path 172 shown in FIG. 12, travelling from the top of the contaminant-removal region 166 to the bottom thereof, and enters the gas-mixing region 164 of the next chamber 142C via the interconnecting passages 146 of the baffle 140B.

The fluid flow travels in chamber 142C in a similar manner as described above. In particular, the fluid flow travels along an upward helical spiral flow path 174 in the gas-mixing region 164, where gas bubbles 176 are injected from one or more gas inlets 118 at a speed similar to that of the fluid flow. The gas bubbles 176 engage the oil in the fluid flow and carry the oil to the liquid surface in the contaminant accumulation section 122. The oil-removed fluid flow enters the contaminant-removal region 166 from the top edge 182 of the shroud 162, and then travels along a downward helical spiral flow path 172 towards the bottom of the contaminant-separation section 122. As shown in FIGS. 11, 14 and 15, the oil-removed fluid flow is discharged through the fluid outlet 116.

The secondary-phase separation apparatus 100 provides an elongated flow path in the contaminant-separation section 124 for contaminant removal. With the elongated flow path, contaminant and/or unwanted secondary phase have increased time to rise to the surface for removal, thereby increasing the effectiveness of contaminant removal. Moreover, the elongated flow path allows the contaminant to remain in the contaminant-separation section 122 of the vessel 102 for prolonged time with increased chances (through the longer path and being brought up to the surfaces) to come into contact and adhere to gas bubbles and thereby become separated.

By partitioned the contaminant-separation section 122 of the vessel 102 into a plurality of nested chambers 142, the flow path is "wrapped" into an elongated helical spiral flow path through the plurality of nested chambers 142, thereby reducing the space occupied by the secondary-phase separation apparatus 100. In each chamber 142 (except for the outermost chamber 142A in above embodiments), the fluid flow is directed to first flow along an upward helical spiral flow path in a gas-mixing region 164 of the chamber 142. At the same time, gas bubbles or bubbles 176 are injected from a lower portion of the chamber 142, and flow upwardly towards the surface. The substantial flow direction alignment of the multiple-phase fluid flow and the gas bubbles 176 gives rise to great ability of the gas bubbles to engage the contaminant, carry the contaminant towards the surface, and maintain the contaminant at the surface.

Then, the fluid flow is directed to flow along a downward flow path to enter a next chamber or (when in the last chamber) to discharge via the fluid outlet 116. As the contaminant is generally richer in the upper portion of fluid than in the lower portion thereof, directing fluid flow into the next chamber from an upper portion thereof prevents or otherwise greatly reduces the "short-circuiting" problem. Moreover, in embodiments wherein the fluid flow speed is sufficiently high, the elongated helical spiral flow path causes the fluid stream to swirl in an upper region of the vessel 102 so that the contaminant which has risen to the upper region of the vessel 102 flows towards and into the skimming structure 160. In these embodiments, the liquid surface 126 in the chambers 142 is illustrated in FIG. 14A. As shown, the fluid surface 126 in an inner chamber is lower than that in an outer chamber. Also shown in FIG. 14A, the sidewalls of the trough 160 are staggered or stepped to adapt to the fluid surface 126 in the chambers 142. In particular, each of the side walls of the trough 160 has a higher height in an upstream chamber (such as in chamber 142A of FIG. 3) that in a downstream chamber (such as chamber 142B in FIG. 3).

In embodiments wherein the fluid flow speed is low, the fluid surface 126 may be at a same height across all chambers 142, as shown in FIG. 14B. In these embodiments, the sidewalls of the trough 160 have a uniform height across all chambers 142.

Although not shown in FIGS. 1 to 15, those skilled in the art will appreciate that the secondary-phase separation apparatus 100 may comprise other components as needed. For example, the secondary-phase separation apparatus 100 may comprise a gas outlet on the top wall 106 of the vessel 102 for discharging the gas accumulated in the contaminant-accumulation section 122 thereof. As another example, the secondary-phase separation apparatus 100 may comprise a support or stand for maintaining the vertical orientation thereof.

Those skilled in the art will appreciate that various alternative embodiments are also readily available. For example, in above embodiments, the fluid outlet 116 is located at the bottom wall 108 within the contaminant-removal region 166 of the innermost chamber 142C. In an alternative embodiment, the fluid outlet 116 is located at a lower portion of the side wall 104 of the contaminant-separation section 124, and extends into the contaminant-removal region 166 of the innermost chamber 142C.

Figure 16:
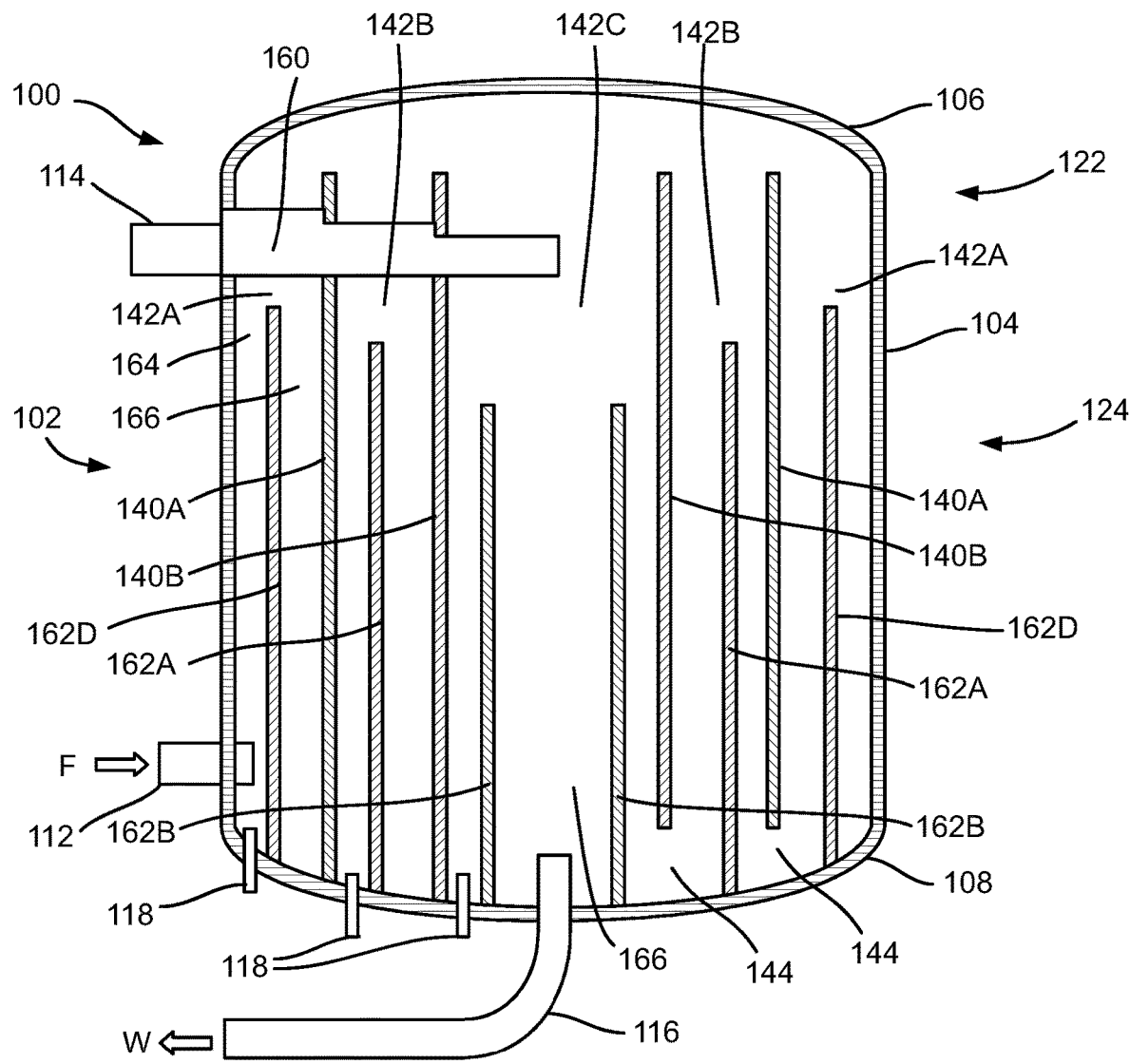
FIG. 16 is a cross-sectional view of a secondary-phase separation apparatus, according to an alternative embodiment of this invention.

In above embodiments, the fluid inlet 112 is located at an upper portion of the contaminant-separation section 124 of the vessel 102, and the outermost chamber 140A does not comprise any shroud. In an alternative embodiment as shown in FIG. 16, the fluid inlet 112 is located at a lower portion of the contaminant-separation section 124. Correspondingly, the outermost chamber 142A comprises a shroud 162D extending upwardly from the bottom wall 108 for partitioning the chamber 142A into a gas-mixing region 164 and a contaminant-removal region 166. Moreover, the gas-mixing region 164 of the outermost chamber 142A comprises one or more gas inlets 118 in proximity with the bottom wall 108 for injecting gas bubbles or microbubbles thereinto.

In above embodiments, the nested baffles 140 are arranged in a concentric manner. In an alternative embodiment, at least some baffles 140 are arranged in a nested but eccentric manner.

In above embodiments, the shrouds 162 are arranged in a concentric manner. In an alternative embodiment, at least some shrouds 162 are arranged in a nested but eccentric manner.

In above embodiments, the bottom of the trough 160 is leveled and extends horizontally towards the innermost chamber of the chambers 142. In some alternative embodiments, the bottom of the trough 160 may be sloped or inclined upwardly towards the innermost chamber of the chambers 142. In some other embodiments, the bottom of the trough 160 may be sloped or inclined downwardly towards the innermost chamber of the chambers 142.

Figure 17A:
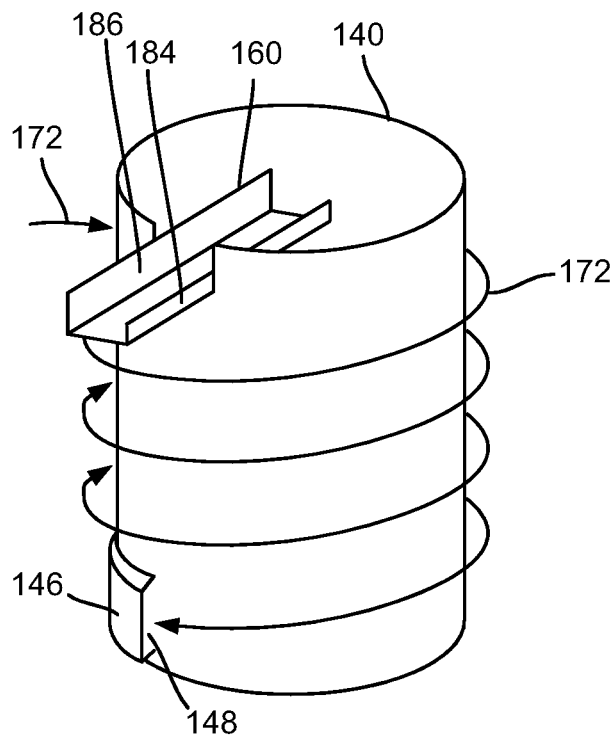
FIG. 17A shows a trough and a baffle of a secondary-phase separation apparatus, according to another embodiment.

In above embodiments, the two sidewalls of the trough 160 have a same height. In some alternative embodiments, the two sidewalls of the trough 160 may have different heights. For example, in one embodiment, the sidewall 184 of the trough 160 facing the fluid flow has a smaller height than that of the sidewall 186 away from the fluid flow, as shown in FIG. 17A.

Figure 17B:
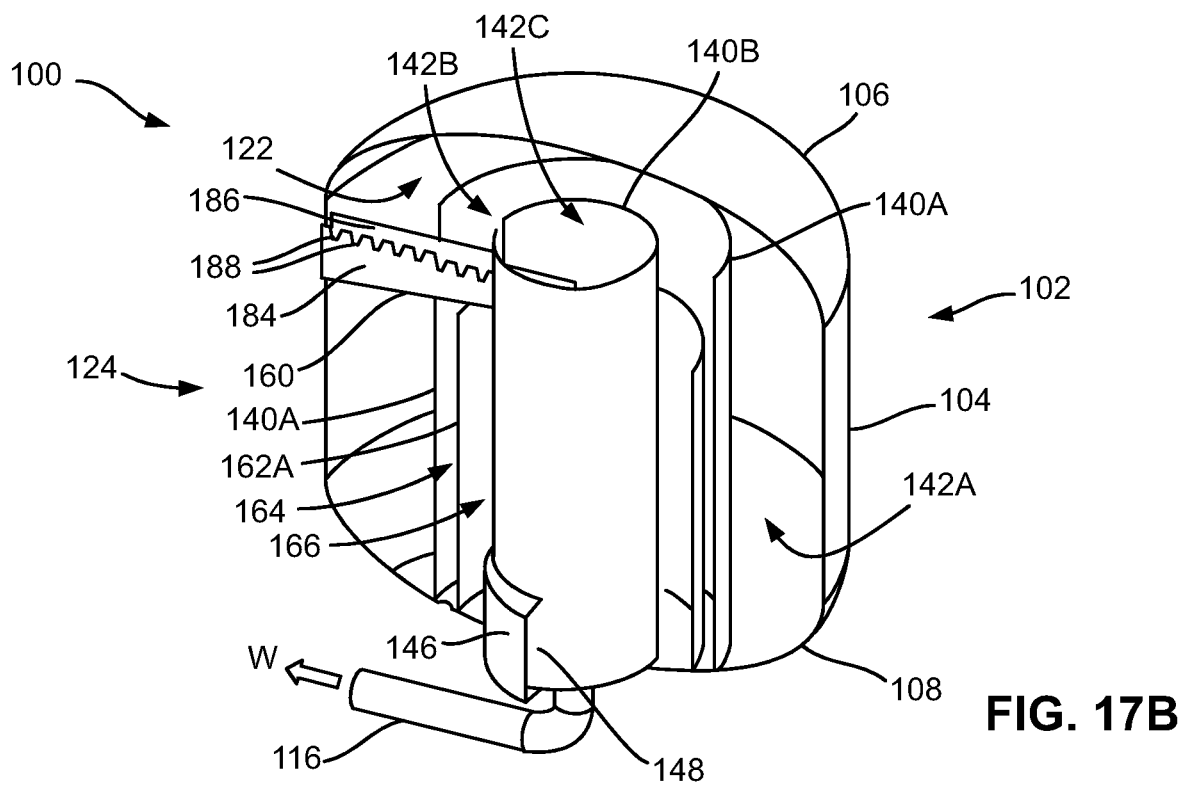
FIG. 17B is a perspective view of the secondary-phase separation apparatus, according to another embodiment, wherein a portion of the vessel wall removed for showing the interior structure thereof, and wherein the sidewall of the trough facing the fluid flow comprises a plurality of notches.

In some alternative embodiments as shown in FIG. 17B, the sidewall 184 facing the fluid flow comprises a plurality of notches 188 for controlling the skimming rate. In these embodiments, the sidewall 186 away from the fluid flow does not comprise any notches. However, those skilled in the art will appreciate that, in some other embodiments, the sidewall 186 away from the fluid flow may also comprise a plurality of notches.

Those skilled in the art will appreciate that, in some alternative embodiments, other skimming structures and methods such as skim bucket, floating skimmer, and the like, may be used for collecting and removing the separated contaminant. In some alternative embodiments, each chamber may comprise a separate skimming component such as above-described skimming trough 160, skim bucket, floating skimmer, and the like, for collecting and removing the separated contaminant therein. In some of these embodiments, the skimming components may be the same. In others of these embodiments, the skimming components may be different.

In above embodiments, the vessel 102 comprises a cylindrical side wall 104, a hemispherical or semi-elliptical top wall 106, and a hemispherical or semi-elliptical bottom wall 108. However, those skilled in the art will appreciate that in various embodiments, the sidewall 104, top wall 106, and the bottom wall 108 may be in any suitable shapes. For example, in one embodiment, the vessel 102 comprises a flat top wall 106 and a flat bottom wall 108.

In above embodiments, the top wall 106, the sidewall 104, and the bottom wall 108 are welded together to form the vessel 102. However, those skilled in the art would readily understand that they may alternatively be coupled using other means, for example suitable fasteners such as bolts and flanges.

In above embodiments, the top edge of each baffle 140 is at a distance from the top wall 106 for facilitating the accumulation and collection of gas and the separated contaminant. However, those skilled in the art appreciate that, in an alternative embodiment, the top edge of one or more baffles 140 may extend to the top wall 106.

In above embodiments, the baffles 140 are cylindrical in shape. In some alternative embodiments, the baffles 140 may have other suitable shapes. For example, in one embodiment, one or more of the baffles 140 may have an elliptical cross-section. In another example, one or more of the baffles 140 may have a rectangular cross-section.

In above embodiments, the shrouds 162 are cylindrical in shape. In some alternative embodiments, the shrouds 162 may have other suitable shapes. For example, in one embodiment, one or more of the shrouds 162 may have an elliptical cross-section. In another example, one or more of the shrouds 162 may have a rectangular cross-section.

In above embodiments, each gas inlet 118 has a substantially horizontal discharge end 120 for downwardly injecting gas bubbles. In an alternative embodiment, at least some of the gas inlets 118 have a discharge end 120 for injecting gas bubbles at any other suitable directions such as injecting gas bubbles upwardly.

In above embodiments, the height of each shroud 162 is selected to adapt to the liquid surface elevation. In particular, the shroud at an upstream of the flow path (e.g., shroud 162A in FIG. 14A) has a height higher than that of the shroud at a downstream of the flow path (e.g. shroud 162B in FIG. 14A). In an alternative embodiment, all shrouds 162 have a same height.

Figure 18:
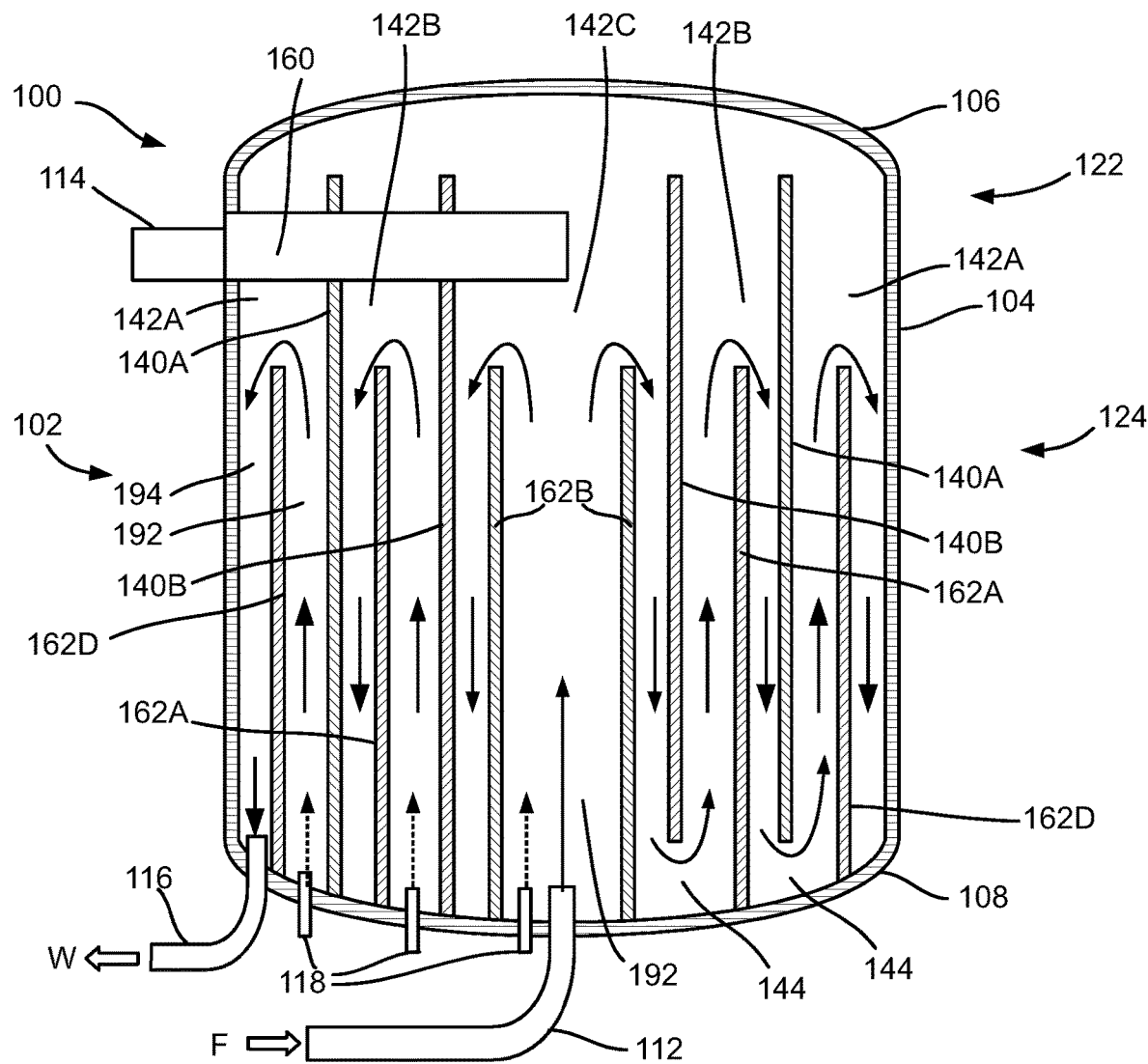
FIG. 18 is a cross-sectional view of a secondary-phase separation apparatus, according to an alternative embodiment.

In an alternative embodiment as shown in FIG. 18, the fluid inlet 112 extends from a lower portion of the vessel 102 such as the bottom wall 108 thereof into a lower portion of the innermost chamber 142C. Correspondingly, the fluid outlet 116 is at a lower portion of the vessel 102 in fluid communication with the outer region 194 of the outermost chamber 142A. After discharged from the fluid inlet 112, the multiple-phase fluid F then travels along an elongated flow path from the innermost chamber 142C to the outermost chamber 142A. The contaminant-removed fluid is then discharged from the outer region 194 of the outermost chamber 142A via the fluid outlet 116. In this embodiment, each shroud 162A, 162B, 162D partitions the respective chamber 142 into an inner gas-mixing region 192 and an outer contaminant-removal region 194. Each gas inlet 118 extends into a lower portion of a respective inner gas-mixing region 192.

Figure 19:
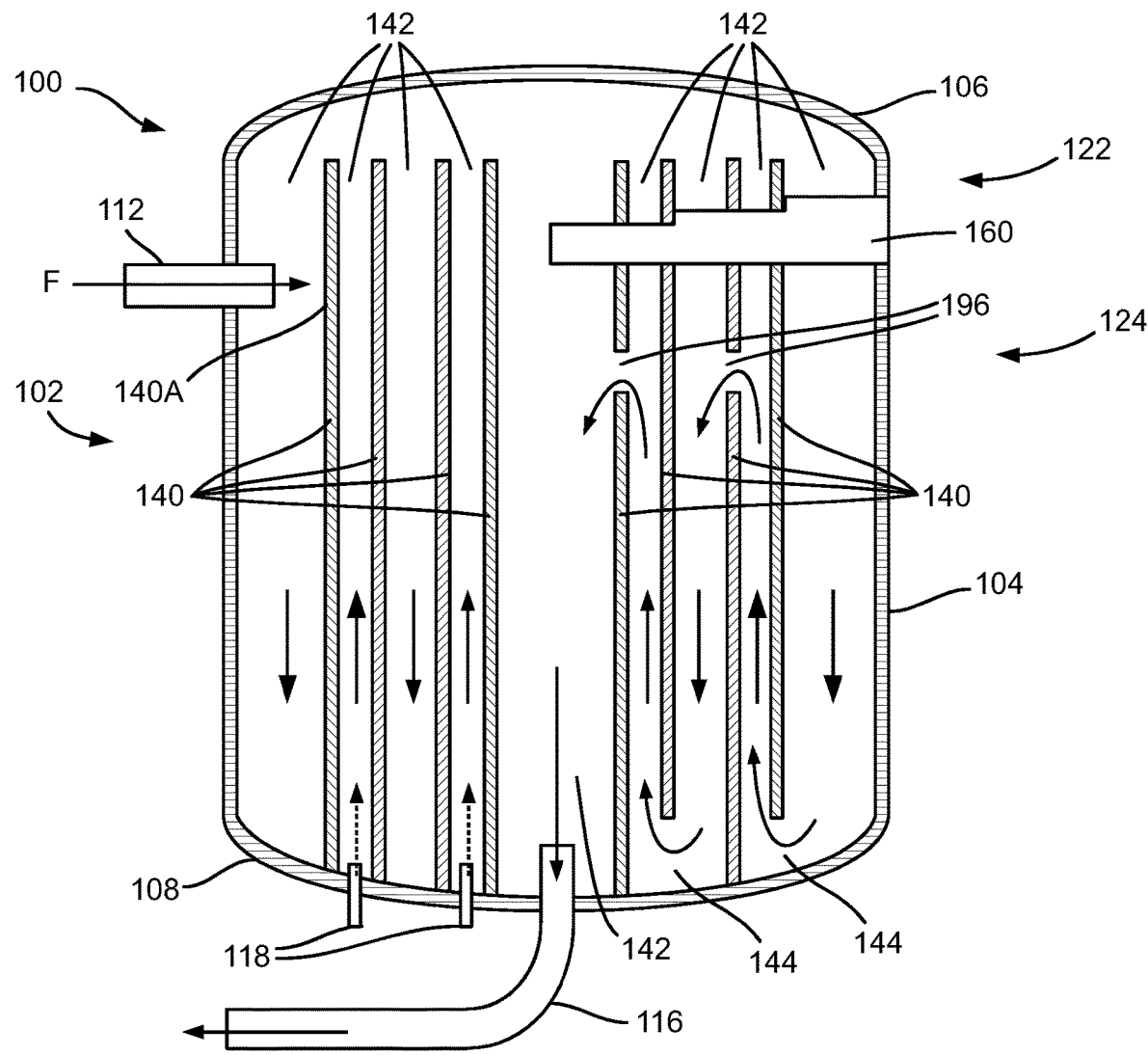
FIG. 19 is a cross-sectional view of a secondary-phase separation apparatus, according to another embodiment.

In an alternative embodiment as shown in FIG. 19, the vessel 102 comprises a plurality of cylindrical baffles 140 partitioning the interior space of the vessel 102 into a plurality of chambers 142. Each baffle 140 extends upwardly from the bottom wall 108 of the vessel 102 into the contaminant-accumulation section 122. A fluid inlet 112 extends into the vessel 102 from an upper portion thereof and at an elevation below the top edge of the outermost baffle 140A.

In this embodiment, the baffles 140 alternately have side-openings at an upper portion or a lower portion thereof. In particular, numbering the baffles 140 from the baffle forming the chamber receiving the fluid outlet 116 (e.g., the baffle forming the innermost chamber in FIG. 19) to the baffle forming the chamber receiving the fluid inlet 112 (e.g., the baffle forming the outermost chamber in FIG. 19), each of the odd-numbered (i.e., the first, third, fifth, and so on) baffles comprises an upper opening 196 at an upper portion thereof, and each of the even-numbered (i.e., the second, fourth, sixth, and so on) baffles 140 comprises a lower side opening 144 at a lower portion thereof. Each of the openings 144 and 196 may be coupled to and in fluid communication with an interconnecting passage (not shown). In this embodiment, each upper opening 196 is a side opening. However, those skilled in the art will appreciate that, in an alternative embodiment, one or more upper openings 196 may be the open top of the baffle 140.

In this embodiment, one or more chambers upstream to an adjacent upper side opening 144 receive one or more gas inlets 118 at a lower portion thereof.

In above embodiments, the one or more gas inlets 118 inject gas bubbles into a lower portion of their respective chambers. In some alternative embodiments, the one or more gas inlets 118 may be located at any suitable elevation of their respective chambers and inject gas bubbles at any suitable elevation in their respective chambers.

Those skilled in the art will appreciate that the cross-sectional sizes of the chambers 142 may be configured based on any suitable criteria. For example, in some embodiments, the cross-sectional sizes of the chambers 142 are configured for maintaining a substantively constant flow rate. In some embodiments, the inner chambers may have larger cross-sectional sizes that the outer chambers. In some embodiments, the inner chambers may have smaller cross-sectional sizes that the outer chambers. In some embodiments, all chambers have a same cross-sectional size. In some embodiments, the distances between any two adjacent baffles 140 are the same.

Those skilled in the art will appreciate that the cross-sectional sizes of the gas-mixing region 192 and the contaminant-removal region 194 in each chamber 142 may be configured based on any suitable criteria. For example, in some embodiments, the cross-sectional sizes of the gas-mixing regions 192 and the contaminant-removal regions 194 are configured for maintaining a substantively constant flow rate. In some embodiments, the gas-mixing region 192 may have a larger cross-sectional size that the contaminant-removal region 194. In some embodiments, the gas-mixing region 192 may have a smaller cross-sectional size that the contaminant-removal region 194. In some embodiments, the gas-mixing region 192 may have the same cross-sectional size that the contaminant-removal region 194.

Figure 20:
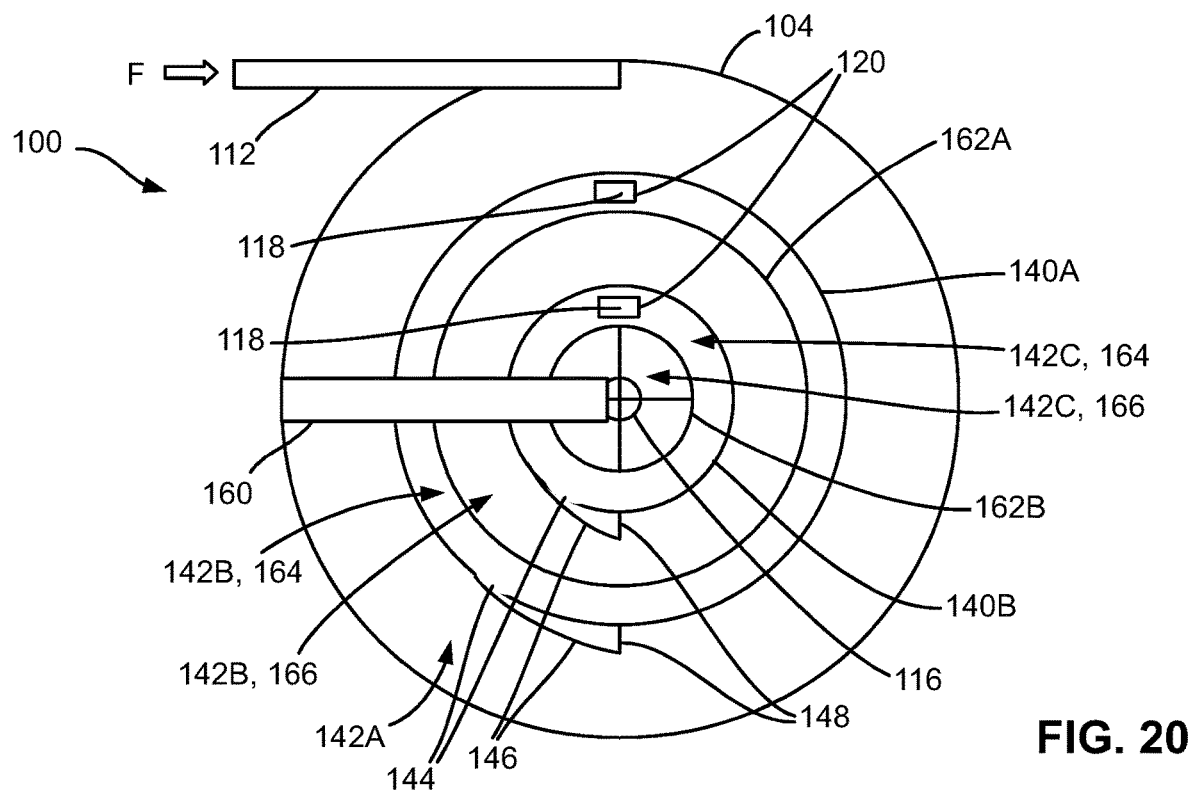
FIG. 20 is a plane view of the secondary-phase separation apparatus with the top wall thereof removed for showing the interior structure thereof, according to an alternative embodiment, wherein each baffle of the secondary-phase separation apparatus comprises one side opening.

Although in above embodiments, each baffle 140 comprises two side openings 144, in some alternative embodiments as shown in FIG. 20, each baffle 140 only comprises one side opening 144. Each side opening 144 is coupled to an interconnection passage 146.

Figure 4:
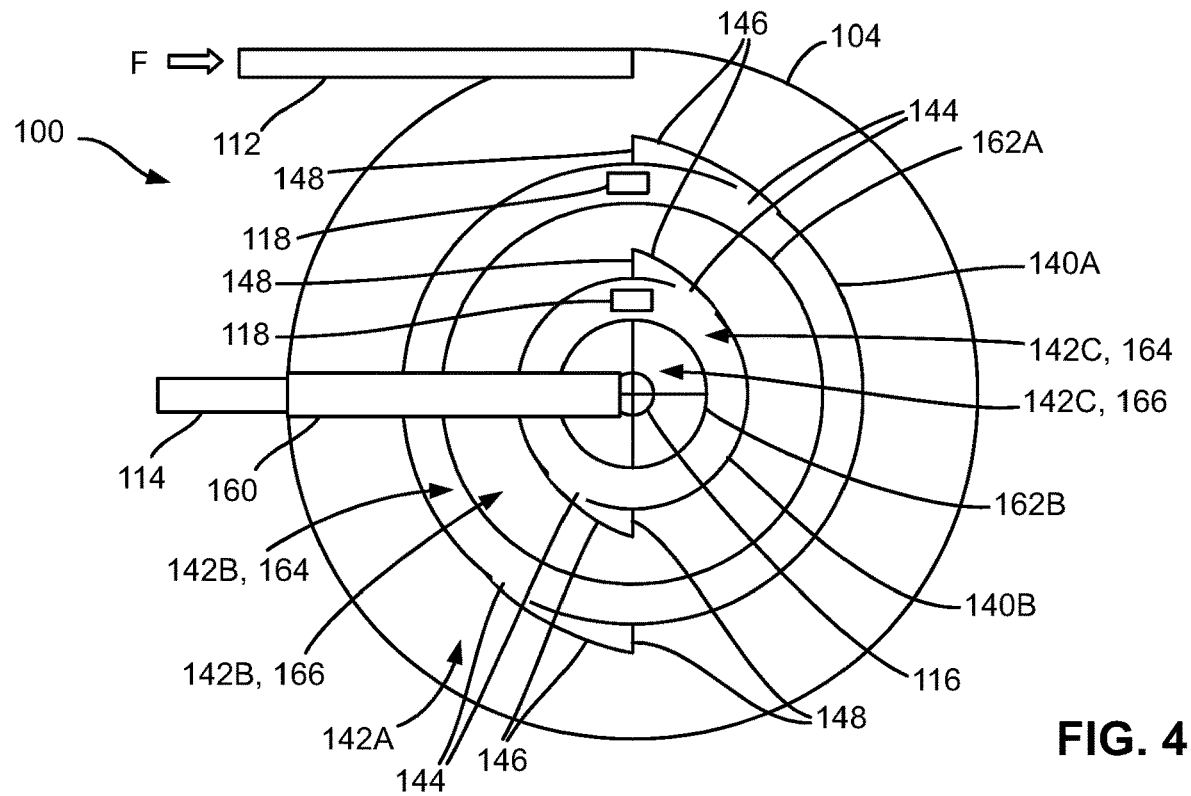
FIG. 4 is a plane view of the secondary-phase separation apparatus shown in FIG. 1 with the top wall thereof removed for showing the interior structure thereof.
Figure 5:
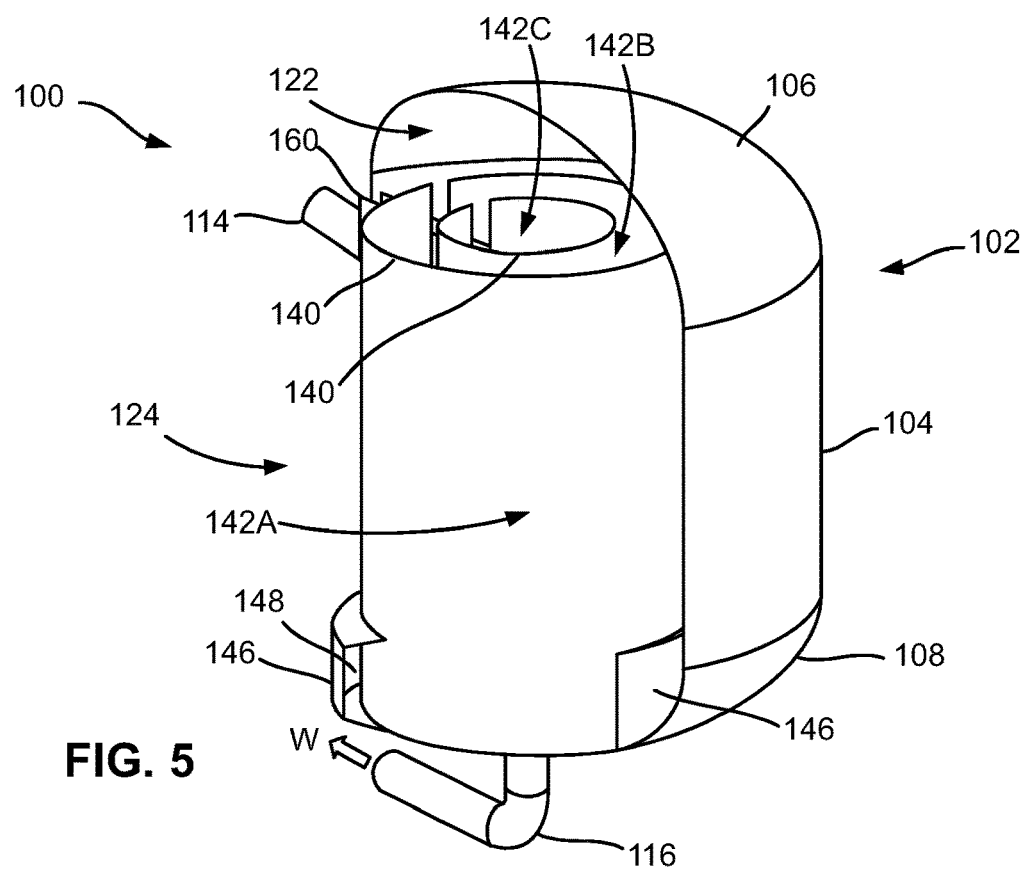
FIGS. 5 to 7 are perspective views, from different viewing angles, of the secondary-phase separation apparatus shown in FIG. 1 with a portion of the vessel wall removed for showing the interior structure thereof.
Figure 6:
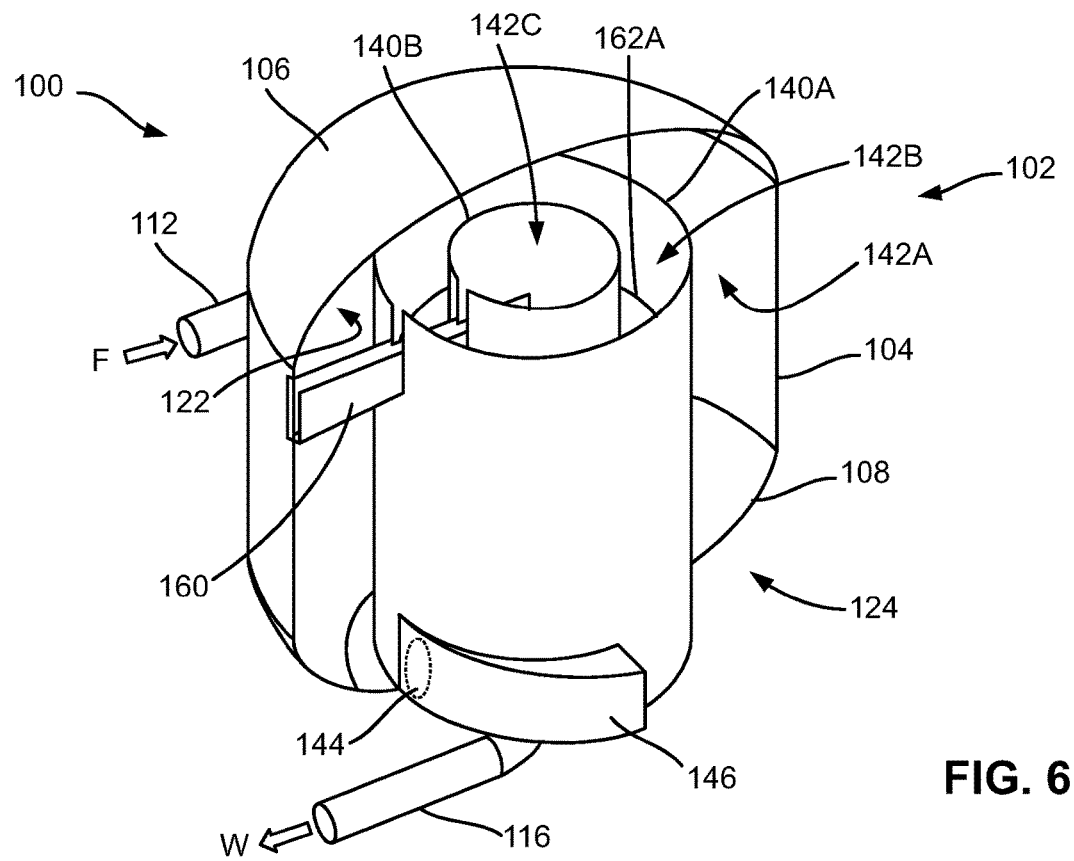
Figure 7:
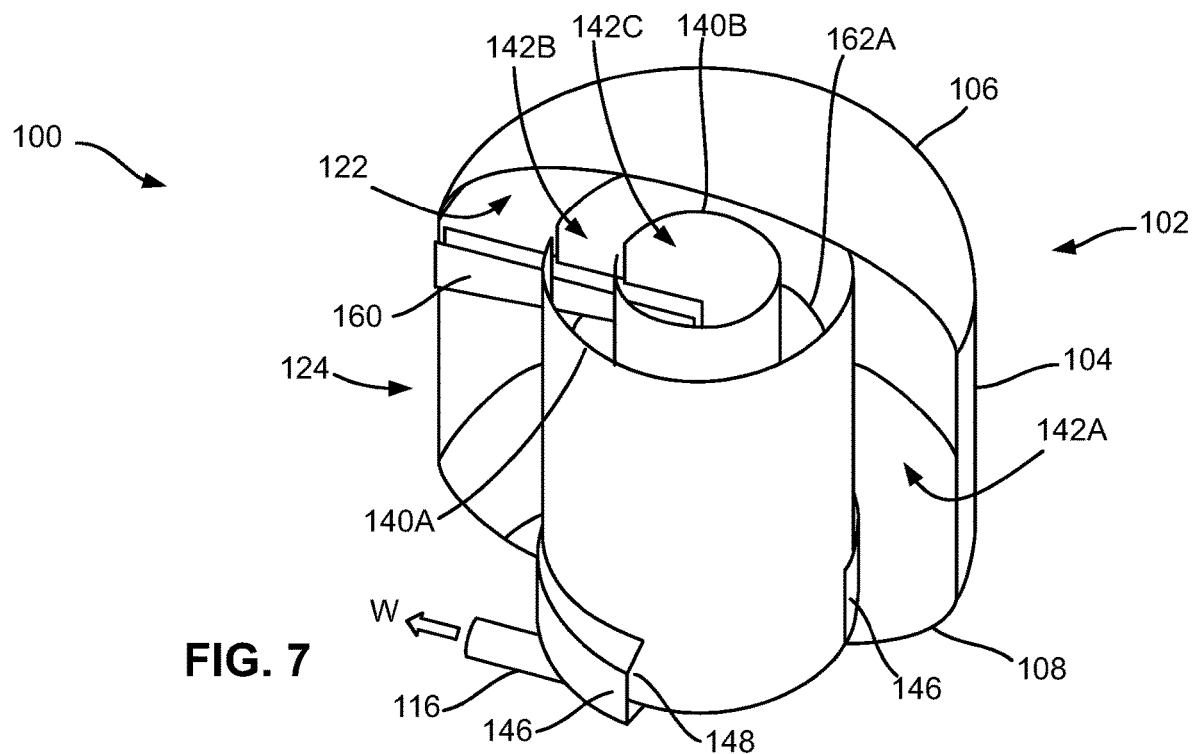
Figure 8:
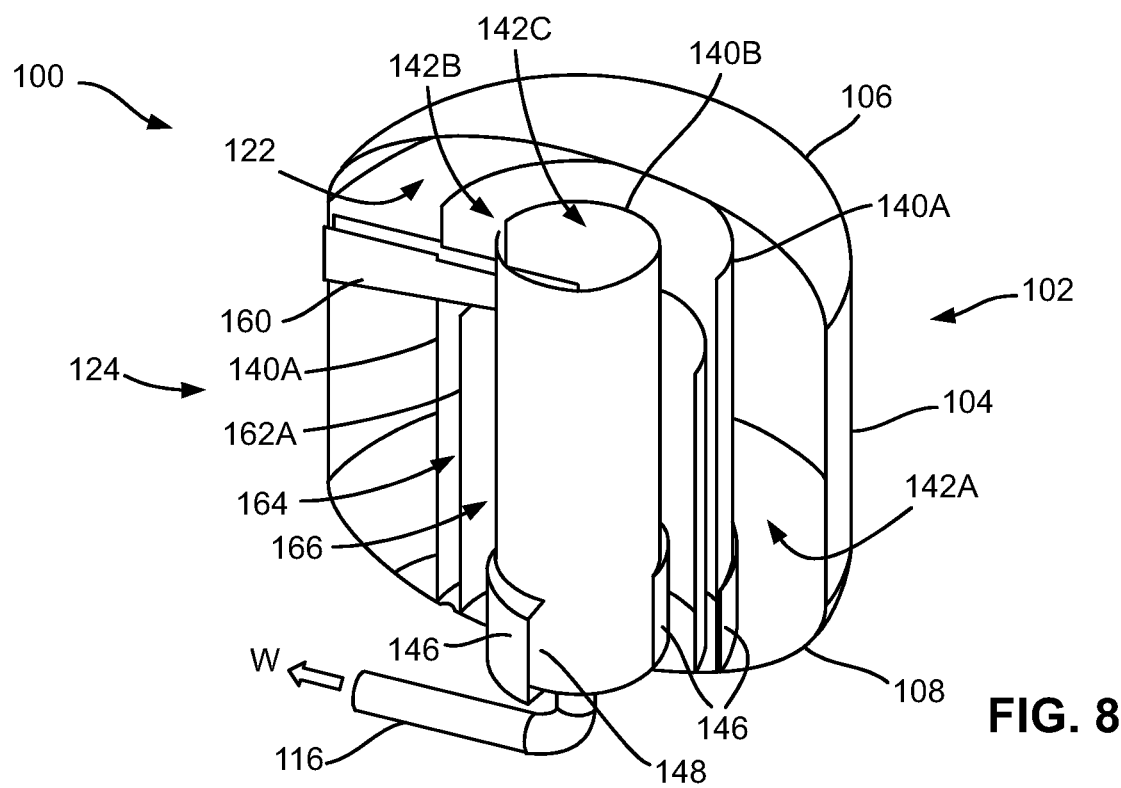
FIGS. 8 and 9 are perspective partially-cross-sectional views, from different viewing angles, of the secondary-phase separation apparatus shown in FIG. 1 with a portion of the vessel wall and interior structures removed.
Figure 9:
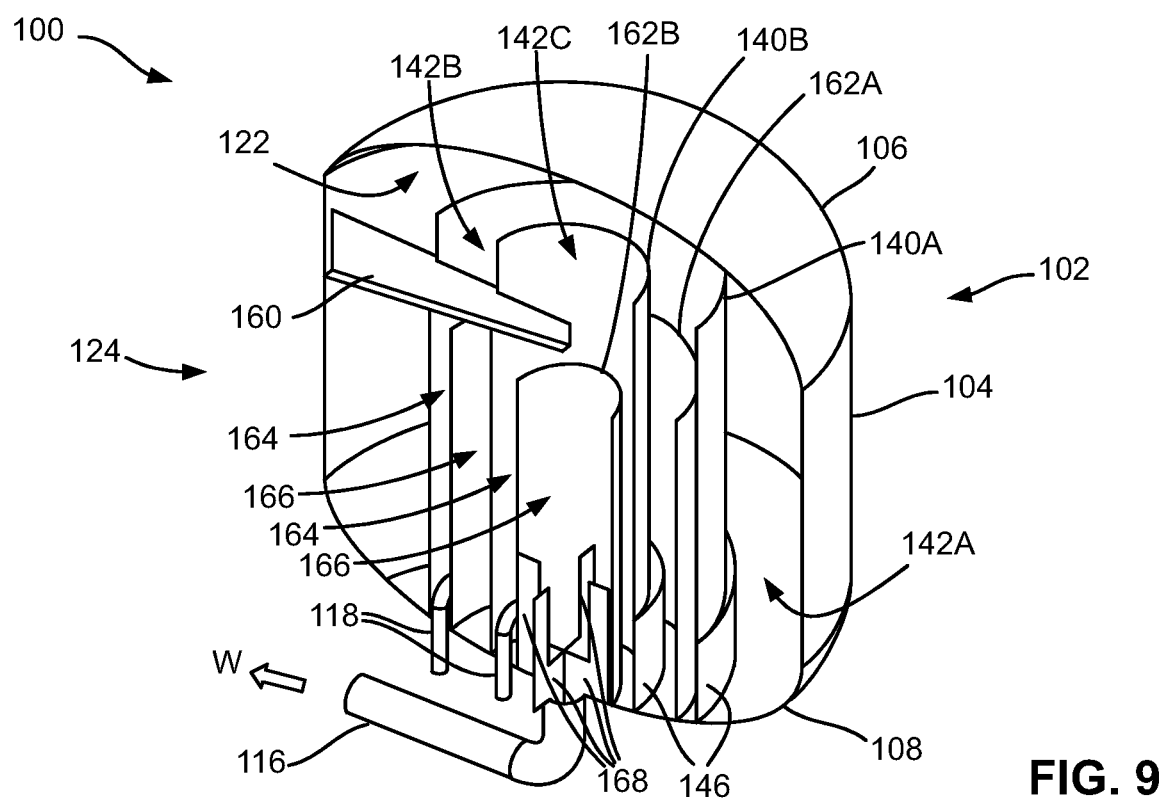

In the embodiment shown in FIG. 4, each gas inlet 118 is positioned on the opposite side of the passage outer opening 148 of the corresponding interconnection passage 146 with respect to the center of the separation apparatus 100, with the discharge end 120 of the gas inlet 118 facing downstream of the flow path.

Figure 21:
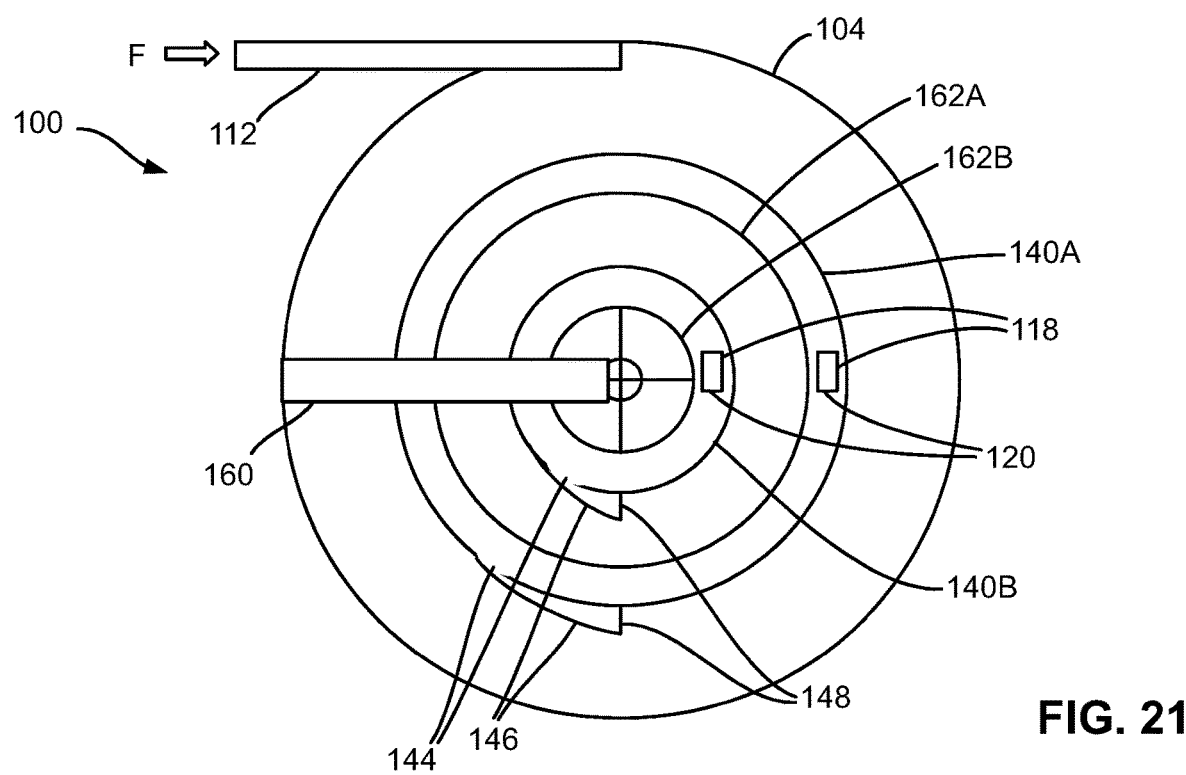
FIG. 21 is a plane view of the secondary-phase separation apparatus with the top wall thereof removed for showing the interior structure thereof, according to an alternative embodiment, wherein each gas inlet is positioned at about 270° downstream to the passage outer opening of the corresponding interconnection passage with respect to the center of the separation apparatus, with the discharge end of the gas inlet facing downstream of the flow path.

In an alternative embodiment as shown in FIG. 21, each gas inlet 118 is positioned at about 270° downstream to the passage outer opening 148 of the corresponding interconnection passage 146 with respect to the center of the separation apparatus 100, with the discharge end 120 of the gas inlet 118 facing downstream of the flow path.

Figure 22:
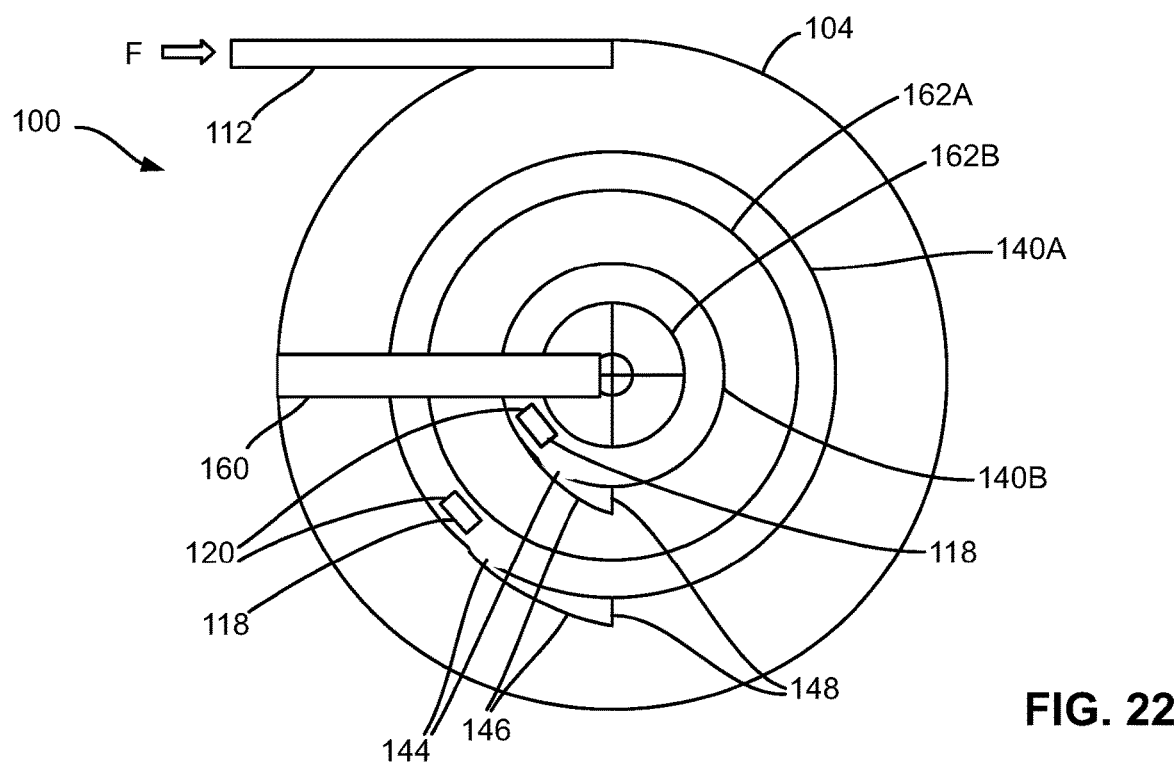
FIG. 22 is a plane view of the secondary-phase separation apparatus with the top wall thereof removed for showing the interior structure thereof, according to yet an alternative embodiment, wherein each gas inlet is positioned in proximity with and downstream to the passage inner opening of the corresponding interconnection passage with respect to the center of the separation apparatus, with the discharge end of the gas inlet facing downstream of the flow path.

In an alternative embodiment as shown in FIG. 22, each gas inlet 118 is positioned in proximity with and downstream to the passage inner opening 144 of the corresponding interconnection passage 146 with respect to the center of the separation apparatus 100, with the discharge end 120 of the gas inlet 118 facing downstream of the flow path.

Figure 23:
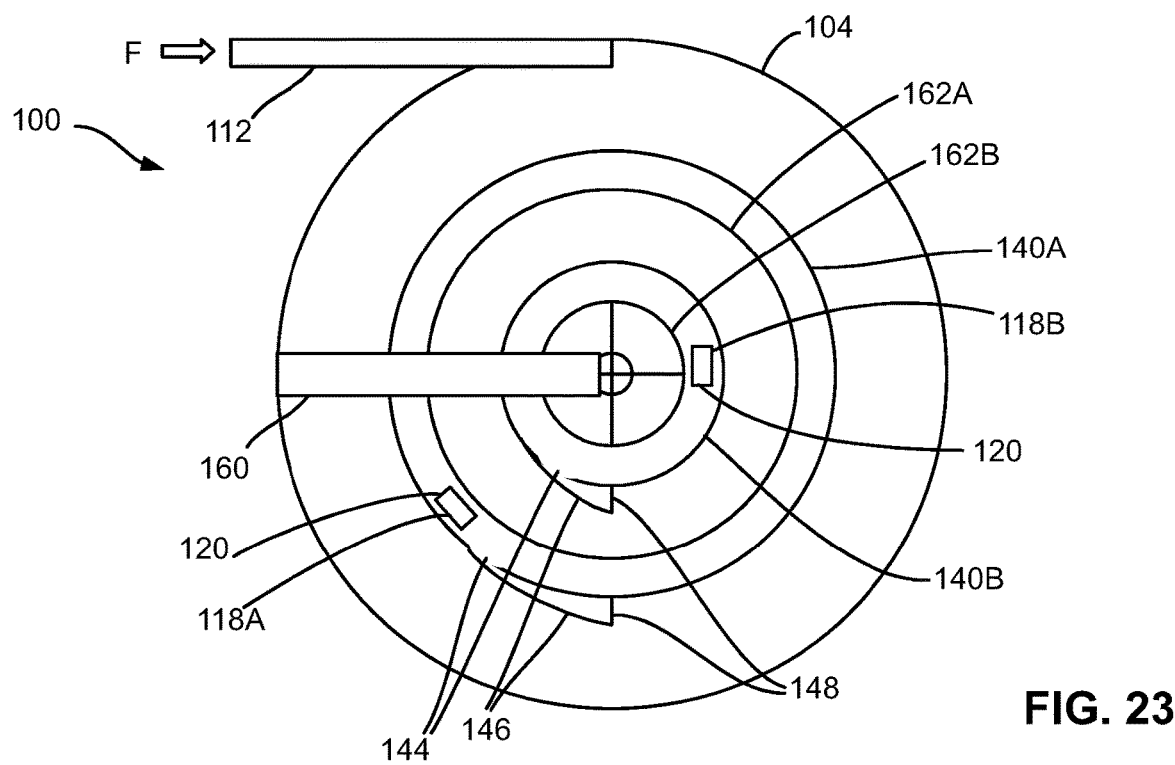
FIG. 23 is a plane view of the secondary-phase separation apparatus with the top wall thereof removed for showing the interior structure thereof, according to still an alternative embodiment, wherein the gas inlets in different chambers are at different positions.

Those skilled in the art will appreciate that the gas inlets in different chambers may be at different positions. For example, in an alternative embodiment as shown in FIG. 23, the gas inlet 118A is positioned in proximity with and downstream to the passage inner opening 144 of the corresponding interconnection passage 146 with respect to the center of the separation apparatus 100, with the discharge end 120 of the gas inlet 118 facing downstream of the flow path. The gas inlet 118B is positioned at about 270° downstream to the passage outer opening 148 of the corresponding interconnection passage 146 with respect to the center of the separation apparatus 100, with the discharge end 120 of the gas inlet 118 facing downstream of the flow path.

Figure 24:
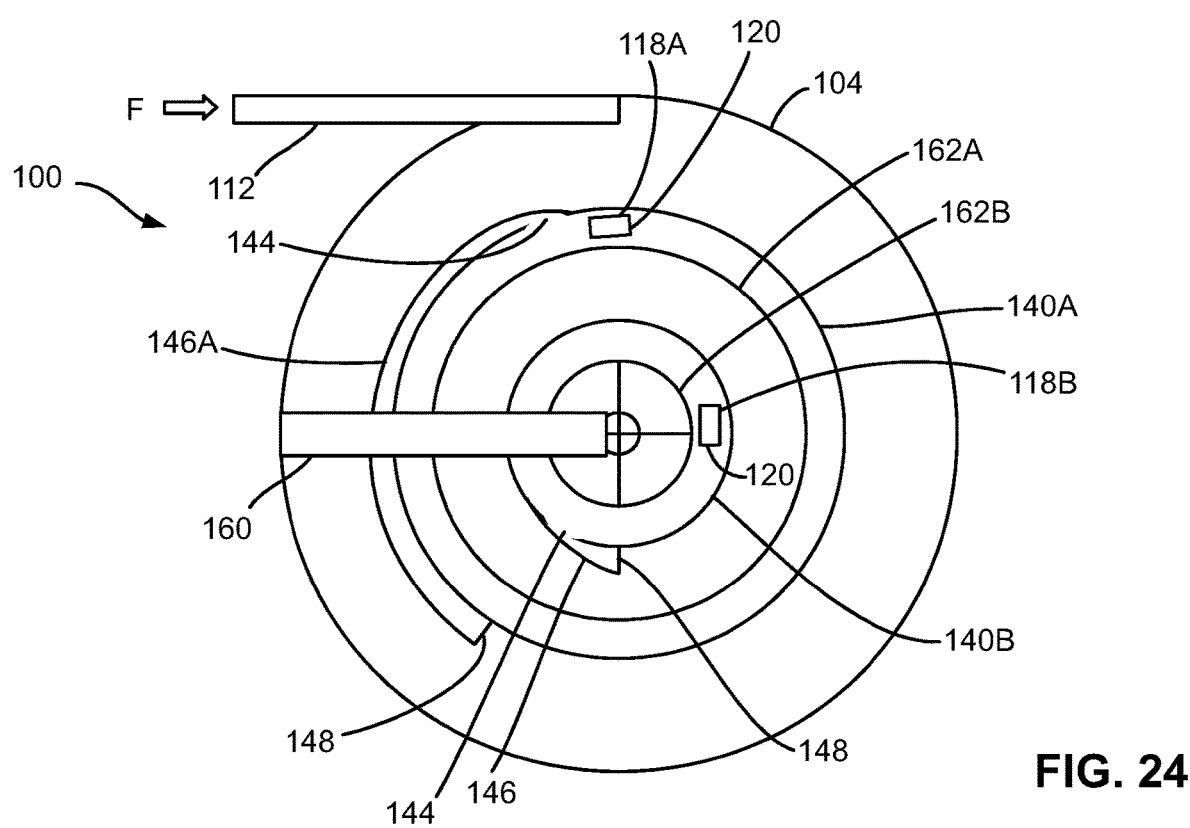
FIG. 24 is a plane view of the secondary-phase separation apparatus with the top wall thereof removed for showing the interior structure thereof, according to another embodiment of the invention.

In above embodiments, each interconnection passage 146 has a relatively short length and the passage inner and outer openings 144 and 148 thereof are near each other. In an alternative embodiment as shown in FIG. 24, at least one interconnection passage 146 has a long length curved along the corresponding baffle 140 such that the passage inner and outer openings 144 and 148 thereof are spaced from each other. For example, as shown in FIG. 23, the interconnection passage 146A has a length of about one-third turn of the corresponding baffle 140A.

In above embodiments, all interconnecting passages 146 have a similar shape and cross-sectional size. However, in an alternative embodiment, some or all interconnecting passages 146 may have different shapes and/or cross-sectional sizes.

In above embodiments, each baffle 140 has only one interconnecting passage 146. In some alternative embodiments, one or more baffles 140 have more than one interconnecting passages 146 distributed therealong.

In above embodiments, each side opening 144 on the baffles 140 is coupled to an interconnecting passage 146. In some alternative embodiment, one or more side openings 144 are not coupled to any interconnecting passages 146.

In above embodiments, the vessel 102 comprises a top wall 106. In some alternative embodiments, the vessel 102 comprises an open top and thus does not comprise a top wall. In these embodiments, no gas outlet is required.

In some alternative embodiments, some or all gas inlets 118 are located at a lower portion of the side wall 104 of the contaminant-separation section 124.

Figure 25:
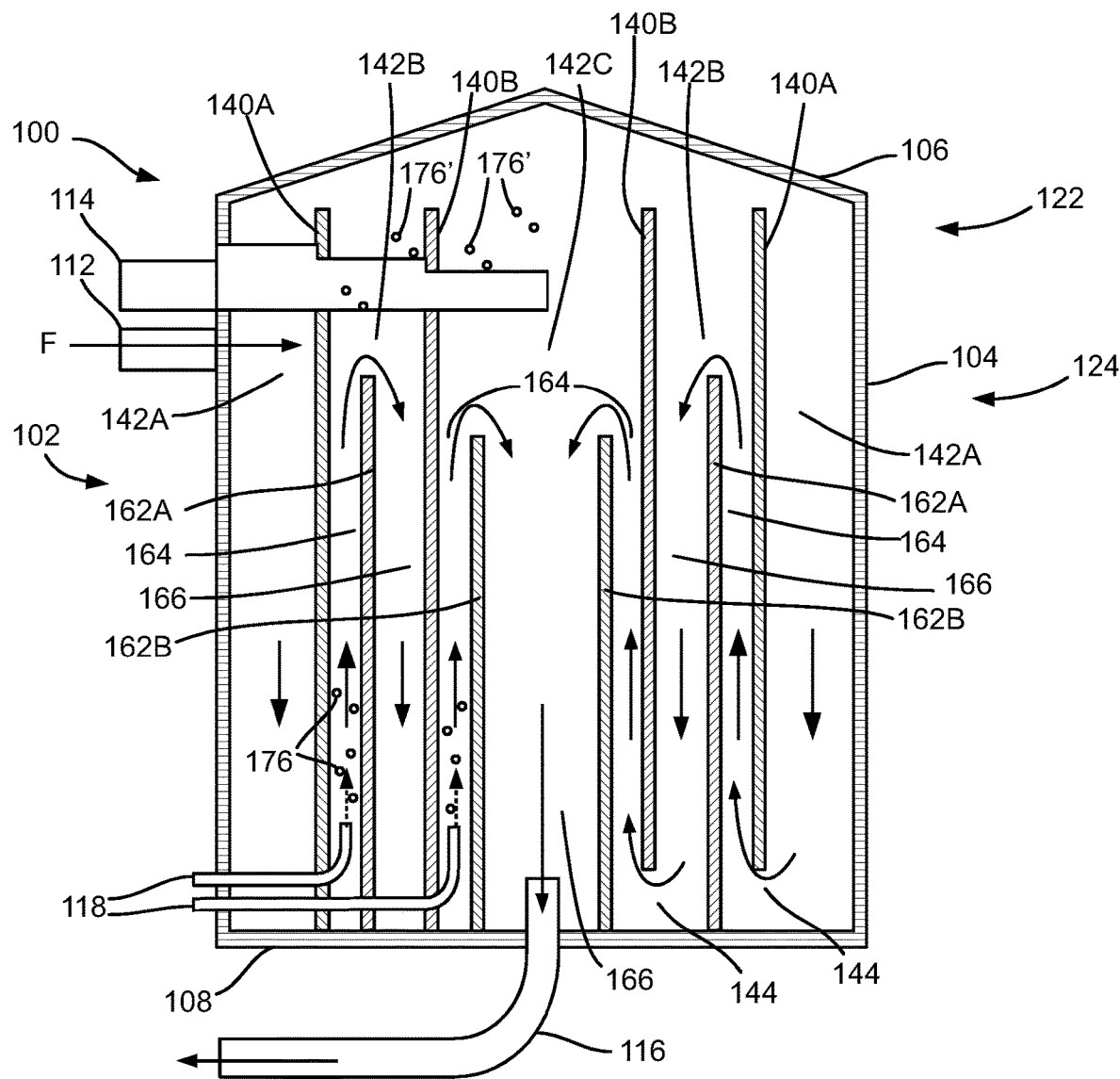
FIG. 25 is a cross-sectional view of the secondary-phase separation apparatus, according to another embodiment of the invention.

In some alternative embodiments as shown in FIG. 25, the secondary-phase separation apparatus 100 comprises a vessel 102 in the form of a cylindrical tank having a flat bottom wall 108, a cylindrical sidewall 104 and a conical top wall 106. In these embodiments, each gas inlet 118 extends from the side wall 104 of the contaminant-separation section 124 into a lower portion of the respective gas-mixing region 164 for injecting gas bubbles thereinto. Other components of the secondary-phase separation apparatus 100 is the same as that shown in FIGS. 1 to 15.

Figure 26:
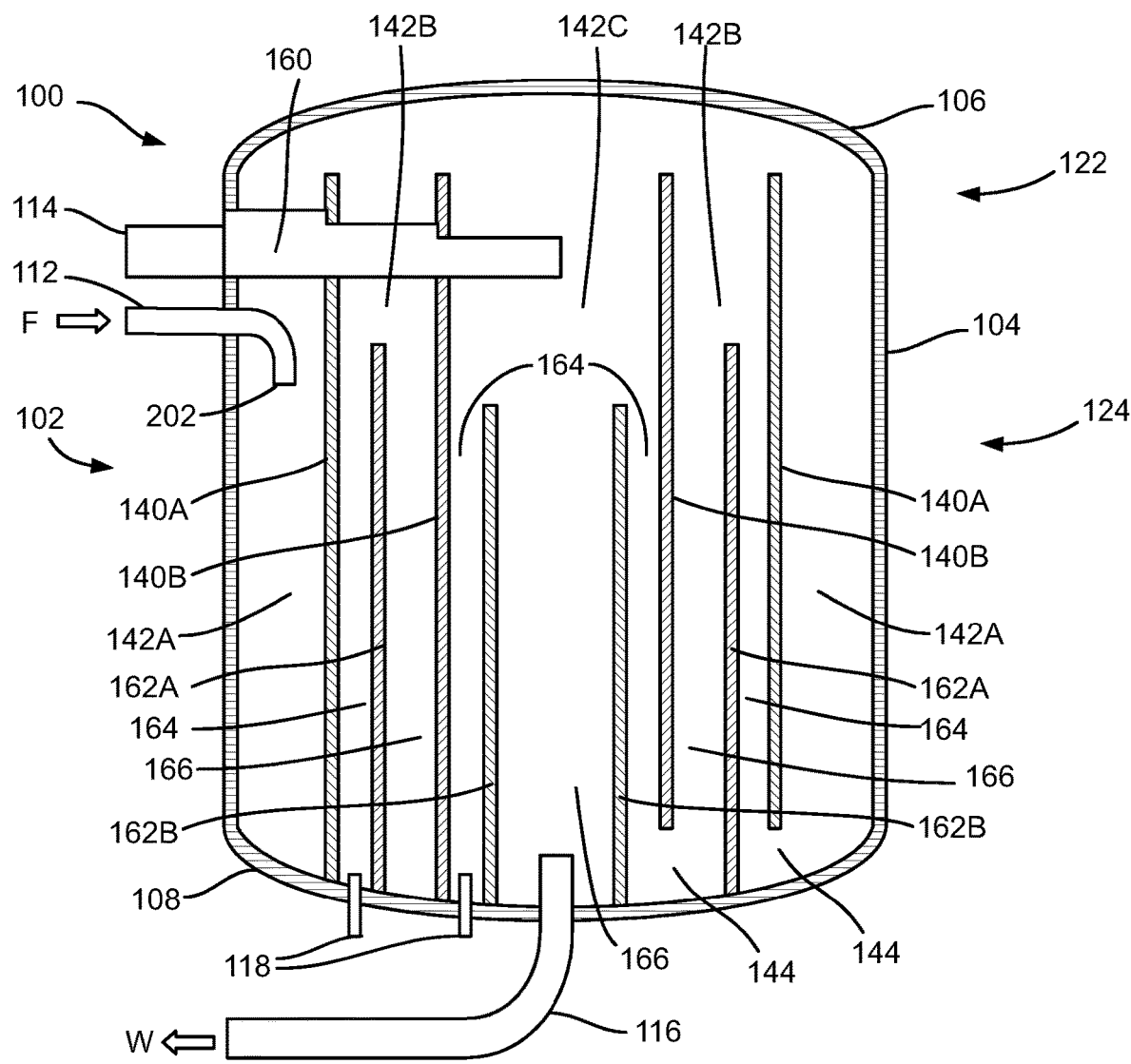
FIG. 26 is a cross-sectional view of the secondary-phase separation apparatus, according to yet another embodiment of the invention.

In above embodiments, the fluid inlet 112 extends substantially horizontally from the sidewall 104 into the vessel 102, and is oriented generally tangential to the sidewall 104 for directing the fluid stream F into the vessel 102. In an alternative embodiment as shown in FIG. 26, the fluid inlet 112 comprises a downward-facing discharge end 202 for downwardly directing the fluid stream F into the vessel 102. In some alternative embodiments, the fluid inlet 112 may discharge the fluid stream F into the vessel 102 at any other suitable directions.

Although embodiments have been described above with reference to the accompanying drawings, those of skill in the art will appreciate that variations and modifications may be made without departing from the scope thereof as defined by the appended claims.

What is claimed is:

1. An apparatus for separating a contaminant from a multiple-phase fluid stream having at least a main-phase fluid and the contaminant, the apparatus comprising:
    a cylindrical vessel formed by at least a bottom wall and a sidewall, the vessel comprising therein a plurality of fluidly connected co-axial chambers formed by one or more cylindrical vertically-oriented co-axial nested baffles coupled to and extending upwardly from the bottom wall of the vessel for forming the plurality of chambers therebetween, each chamber proximate an upper region thereof having and being in communication with a horizontal skimming structure extending radially inwardly from an outermost portion of said cylindrical vessel to a radially most inward portion of said vessel;
    a fluid inlet in fluid communication with one of an innermost or an outermost chamber of the plurality of said nested and fluidly connected chambers for introducing the multiple-phase fluid stream into said vessel; and
    a fluid outlet in fluid communication with the other of the innermost or the outermost chamber of the plurality of said nested and fluidly connected chambers for discharging a contaminant-removed fluid stream out of the vessel;
    wherein each baffle comprises one or more side openings within each baffle at a lower portion thereof for fluidly connecting the chambers and permitting fluid communication between the chambers inner and outer thereto;
    wherein, during operation, said multiple-phase fluid stream travels through said plurality of nested and fluidly connected co-axial chambers in an elongated helical spiral flow path from the fluid inlet to the fluid outlet of the vessel and passes circumferentially along each baffle;
    wherein said multiple-phase fluid stream thereafter passes through the one or more side openings into a circumferentially adjacent co-axial chamber, for allowing the contaminant to separate from the fluid stream and flow into said skimming structure;
    wherein said elongated helical spiral flow path is a downward helical spiral flow path in entering each side opening within each co-axial chamber, and is an upward helical spiral flow path in exiting from each side opening within each co-axial chamber; and
    wherein the one or more side openings on each baffle have a combined circumferential length of a minor portion of a total circumference of the corresponding baffle.

2. The apparatus of claim 1 wherein the fluid inlet is in fluid communication with the outermost chamber and the fluid outlet is in fluid communication with the innermost chamber.

3. The apparatus of claim 1 wherein the fluid inlet is at an elevation at or below a top edge of an outermost baffle of the one or more baffles.

4. The apparatus of claim 1 wherein at least one of the plurality of chambers comprises a vertically-oriented shroud extending upwardly from the bottom wall of the vessel for partitioning the chamber into a first region and a second region.

5. The apparatus of claim 4 wherein the first region is an outer region of the chamber and the second region is an inner region of the chamber.

6. The apparatus of claim 4 wherein each shroud has a height lower than the heights of the baffles neighboring thereto.

7. The apparatus of claim 4 wherein the apparatus further comprising:
one or more gas inlets received in at least one of the plurality of chambers for injecting gas bubbles into at least a beginning portion of the elongated helical spiral flow path for removal of the contaminant;
wherein said elongated helical spiral flow path is an upward helical spiral flow path in each first region, and is a downward helical spiral flow path in each second region; and
wherein at least one of said first regions comprises at least one of the one or more gas inlets.

8. The apparatus of claim 1 further comprising:
one or more gas inlets received in at least one of the plurality of chambers for injecting gas bubbles into at least an upward helical spiral flow portion of the elongated helical spiral flow path for removal of the contaminant.

9. The apparatus of claim 8 wherein the one or more gas inlets inject gas bubbles into a lower portion of the at least one of the plurality of chambers that the one or more gas inlets are received therein.

10. The apparatus of claim 8, wherein each of the one or more gas inlets comprises a discharge end facing a downstream direction of the flow path.

11. The apparatus of claim 1 wherein the skimming structure comprises a skimming trough in fluid communication with at least said outermost of said plurality of chambers and said innermost of said plurality of chambers, wherein said skimming trough has a pair of sidewalls and a bottom wall, and wherein respective heights of the sidewalls of the trough are larger where in fluid communication with said outermost chamber of the one or more chambers than those in the innermost of said plurality of chambers.

12. The apparatus of claim 11 wherein said skimming trough extends through the plurality of chambers for collecting separated contaminant from said upper region of said vessel.

13. The apparatus of claim 1 wherein the fluid inlet is tangential to the sidewall of the vessel.

14. The apparatus of claim 1 wherein the fluid inlet is located at an upper portion of the vessel and at an elevation at or below a top edge of an outermost baffle of the one or more baffles.

15. A method of separating a contaminant from a multiple-phase fluid stream having at least a main-phase fluid and the contaminant, the method comprising:
injecting the fluid stream into a vessel having a plurality of nested and fluidly connected co-axial chambers therein, each chamber coupled to a bottom wall of said vessel and extending upwardly therefrom, comprising one or more side openings at a lower portion of a given area on a cylindrical sidewall thereof for fluid communication with adjacent chambers; wherein the one or more side openings on each cylindrical sidewall have a combined circumferential length of a minor portion of a total circumference of the sidewall;
directing the fluid stream through each of the plurality of nested and fluidly connected chambers in the vessel via an elongated helical spiral flow path passing through the one or more side openings on the sidewall thereof, for separating the contaminant and allowing separated contaminant to rise in the vessel;
skimming the contaminant from the fluid stream proximate an upper region of the vessel; and
discharging contaminant-removed fluid out of the vessel.

16. The method of claim 15 wherein the step of skimming the contaminant from the fluid stream is carried out by:
situating a skimming structure transversely across a portion of said upper region of said vessel; and
causing said fluid stream to swirl in said upper region so that the contaminant which has risen to said upper region of said vessel flows towards and into said skimming structure.

17. The method of claim 15 wherein said injecting the fluid stream into the vessel comprises:
injecting the fluid stream into an outermost chamber of the plurality of nested and fluidly connected chambers; and
wherein said discharging contaminant-removed fluid out of the vessel comprises:
discharging contaminant-removed fluid out of the vessel from an innermost chamber of the plurality of nested and fluidly connected chambers.

18. The method of claim 15 wherein said directing the fluid stream through each of the plurality of nested and fluidly connected chambers in the vessel via the elongated helical spiral flow path comprises:
directing the fluid stream to enter at least one chamber from a lower portion thereof.

19. The method of claim 15 further comprising:
injecting gas bubbles into at least an upwardly flowing portion of the elongated helical spiral flow path in the vessel and towards a downstream direction of the flow path for mixing with the fluid stream for facilitating contaminant removal.

20. The method of claim 19 wherein said injecting the gas bubbles into the vessel comprises: in at least one chamber,
directing the fluid stream to travel within a first region of the chamber via an upward helical spiral flow path, said upward helical spiral flow path being a portion of the elongated flow path;
injecting the gas bubbles into the first region of the chamber for mixing with the fluid stream while the fluid stream is travelling along the upward helical spiral flow path; and
after the fluid stream exits from the first region of the chamber, directing the fluid stream along a downward helical spiral flow path within a second region of the chamber, said upward helical spiral flow path being a portion of the elongated flow path.

21. The method of claim 16 further comprising:
using said skimming structure situated in said upper region of said vessel in at least partial fluid communication with at least one of said plurality of connected chambers to collect contaminant in said upper portion of the vessel.

22. The method of claim 15 wherein said injecting the fluid stream into the vessel comprises:
injecting the fluid stream into the vessel at a direction tangential to a sidewall of the vessel.

23. A vessel for separating a contaminant from a multiple-phase fluid stream having at least a main-phase fluid and the contaminant, the vessel comprising:
one or more internal baffles coupled to and extending upwardly from a bottom wall of the vessel for forming a plurality of coaxial and fluidly connected chambers in the vessel;
a fluid inlet coupled to one of the innermost or outermost chamber of the plurality of coaxial and fluidly connected chambers for introducing the multiple-phase fluid stream into said vessel;

a fluid outlet coupled to the other of the innermost or outermost chamber of the plurality of coaxial and fluidly connected chambers for discharging a contaminant-removed fluid stream out of the vessel; and one or more gas inlets received in at least one of the plurality of co-axial chambers for injecting gas bubbles into an upwardly flowing portion of said fluid stream for removal of the contaminant;

wherein, numbering the one or more internal baffles consecutively from the baffle forming the chamber coupled progressively to the fluid inlet to the baffle forming the chamber coupled to the fluid outlet, each odd-numbered baffle comprises an upper opening at an upper portion thereof and each even-numbered baffle comprises one or more side openings at a lower portion thereof; and wherein, during operation, the fluid stream travels through said plurality of coaxial and fluidly connected chambers in an elongated helical spiral flow path from the fluid inlet to the fluid outlet of the vessel and passing each baffle through the one or more side openings thereof, and gas bubbles injected through said one or more gas inlets agglomerate onto the contaminant for causing the contaminant to separate from the fluid stream and rise upwardly in said vessel and flow into a skimming structure.

24. The vessel of claim 23 wherein at least one of the one or more gas inlets is located approximate said fluid inlet.

25. The vessel of claim 23 wherein each said side opening is coupled to an interconnecting passage on an outer surface of the corresponding baffle.

26. The vessel of claim 23 wherein each chamber upstream to an adjacent one of the upper openings receives therein one or more gas inlets at a lower portion thereof for injecting gas bubbles into the vessel.

27. The vessel of claim 23 wherein the fluid inlet is at an elevation at or below a top edge of the baffle forming the chamber coupled the fluid inlet.

28. The vessel of claim 23 wherein said skimming structure is located at an upper portion of the vessel and extends through the one or more baffles for collecting separated contaminant.

29. The vessel of claim 28 wherein the skimming structure comprises a skimming trough having a pair of sidewalls and a bottom wall; and wherein the height of each of the sidewalls of the skimming trough in a first one of the chambers is larger than that in a second one of the chambers that is downstream to the first chamber.

30. The vessel of claim 23 wherein the bottom wall of the skimming trough extends horizontally, or sloped upwardly, or sloped downwardly, towards the innermost chamber.

\* \* \* \* \*